(12) United States Patent
Morales-Alvarez et al.

(10) Patent No.: US 7,648,352 B2
(45) Date of Patent: *Jan. 19, 2010

(54) APPARATUS FOR IMPRINTING LINES ON DIRECT-EXPANDED FOOD PRODUCTS HAVING COMPLEX SHAPES WITH IMPROVED DIMENSIONAL QUALITY

(75) Inventors: Jorge C. Morales-Alvarez, Plano, TX (US); Eugenio Bortone, Frisco, TX (US); Lewis Conrad Keller, McKinney, TX (US); Edward Leon Ouellette, Denton, TX (US); Scott Alan Richey, Pilot Point, TX (US)

(73) Assignee: Frito-Lay North America, Inc., Plano, TX (US)

( * ) Notice: Subject to any disclaimer, the term of this patent is extended or adjusted under 35 U.S.C. 154(b) by 758 days.

This patent is subject to a terminal disclaimer.

(21) Appl. No.: 10/891,381

(22) Filed: Jul. 14, 2004

(65) Prior Publication Data

US 2005/0019466 A1    Jan. 27, 2005

Related U.S. Application Data

(63) Continuation-in-part of application No. 10/623,048, filed on Jul. 18, 2003, now Pat. No. 6,854,970, and a continuation-in-part of application No. 10/622,400, filed on Jul. 18, 2003, now Pat. No. 7,252,847, and a continuation-in-part of application No. 10/109,398, filed on Mar. 28, 2002, now Pat. No. 6,783,787, said application No. 10/623,048 is a continuation-in-part of application No. 10/047,503, filed on Oct. 29, 2001, now Pat. No. 6,620,448, said application No. 10/622, 400 is a continuation-in-part of application No. 10/047,503, filed on Oct. 29, 2001, now Pat. No. 6,620, 448.

(51) Int. Cl.
*B29C 47/06* (2006.01)

(52) U.S. Cl. .............. 425/131.1; 425/133.1; 425/382.4; 425/462

(58) Field of Classification Search .............. 425/131.1, 425/133.1, 376.1, 382.4, 461, 462
See application file for complete search history.

(56) References Cited

U.S. PATENT DOCUMENTS 449,854 A    4/1891   Herrold (Continued)

FOREIGN PATENT DOCUMENTS

CA    1230005    12/1987

*Primary Examiner*—Robert B Davis
*Assistant Examiner*—Joseph Leyson
(74) *Attorney, Agent, or Firm*—Celina M. Diaz; Carstens & Cahoon, LLP

(57) ABSTRACT

The improved apparatus includes an improved extruder die assembly comprising a forming section, an injection section, and a converging nozzle section having axially aligned ridgelines which gradually project into the bore of the nozzle as the nozzle converges to gradually disrupt the axial flow of an extrudate at specific peripheral points thereby altering the extrudate's velocity profile. By gradually disrupting the axial flow in close proximity to the projecting ridgelines prior to its extrusion, the dimensional quality of the resulting direct expanded food piece is greatly improved. Moreover, by carefully positioning the capillary channels of the injection section into that portion of the flowing extrudate not affected by the axially aligned ridgelines, a distinct colored and/or flavored pattern is imparted into the extrudable food mass during the extrusion process while improving the quality of dimensional design aspects of the resulting extruded, complexly shaped, direct expanded food products.

5 Claims, 17 Drawing Sheets

U.S. PATENT DOCUMENTS

| | | | |
|---|---|---|---|
| 2,764,995 A | 10/1956 | Krupp et al. | |
| 2,858,217 A | 10/1958 | Benson | |
| 3,001,230 A * | 9/1961 | Rossi | 425/461 |
| 3,196,809 A * | 7/1965 | Nelson et al. | 425/463 |
| 3,314,381 A | 4/1967 | Fries et al. | |
| 3,345,186 A | 10/1967 | Kania et al. | |
| 3,408,960 A * | 11/1968 | Stanley | 425/113 |
| 3,447,931 A | 6/1969 | Benson et al. | |
| 3,588,987 A * | 6/1971 | Korostoff et al. | 425/461 |
| 3,622,353 A | 11/1971 | Bradshaw et al. | |
| 3,779,676 A | 12/1973 | Bernard | |
| 3,840,311 A * | 10/1974 | Wight | 425/131.1 |
| 3,885,053 A | 5/1975 | Townsend | |
| 3,991,217 A | 11/1976 | Kinney | |
| 4,061,786 A | 12/1977 | Winkler et al. | |
| 4,068,517 A * | 1/1978 | Fuchs, Jr. | 72/253.1 |
| 4,395,217 A | 7/1983 | Benadi | |
| 4,484,877 A | 11/1984 | Stucke et al. | |
| 4,542,686 A | 9/1985 | Bansal | |
| 4,614,489 A | 9/1986 | Juravic | |
| 4,626,187 A | 12/1986 | Kamada | |
| 4,695,236 A | 9/1987 | Predohl et al. | |
| 4,715,803 A | 12/1987 | Koppa | |
| 4,786,243 A | 11/1988 | Kehoe | |
| 4,835,000 A | 5/1989 | Kehoe | |
| 4,869,911 A | 9/1989 | Keller | |
| 4,900,572 A | 2/1990 | Repholz et al. | |
| 4,940,593 A | 7/1990 | Duffy | |
| 5,019,404 A | 5/1991 | Meisner | |
| 5,066,435 A | 11/1991 | Lorenz et al. | |
| 5,102,602 A | 4/1992 | Ziegler | |
| 5,110,276 A | 5/1992 | Farnsworth et al. | |
| 5,216,946 A | 6/1993 | Huang et al. | |
| 5,296,247 A | 3/1994 | Huang et al. | |
| D368,791 S | 4/1996 | Laughlin | |
| D372,352 S | 8/1996 | Laughlin | |
| D373,671 S | 9/1996 | Laughlin et al. | |
| 5,620,713 A | 4/1997 | Rasmussen | |
| 5,639,485 A | 6/1997 | Weinstein et al. | |
| 5,643,618 A | 7/1997 | Huberg et al. | |
| D384,785 S | 10/1997 | Laughlin | |
| 5,686,128 A | 11/1997 | Tracy et al. | |
| 5,720,987 A | 2/1998 | Ploog | |
| 5,759,603 A | 6/1998 | Francisco et al. | |
| 5,827,557 A | 10/1998 | Weinstein et al. | |
| 5,843,503 A | 12/1998 | Clanton et al. | |
| 5,955,116 A | 9/1999 | Kehoe et al. | |
| 6,143,338 A | 11/2000 | Weinstein et al. | |
| 6,143,339 A | 11/2000 | Weinstein et al. | |
| 6,143,342 A | 11/2000 | Weinstein et al. | |
| 6,251,452 B1 | 6/2001 | Weinstein et al. | |
| 6,258,396 B1 | 7/2001 | Deutsch et al. | |

* cited by examiner

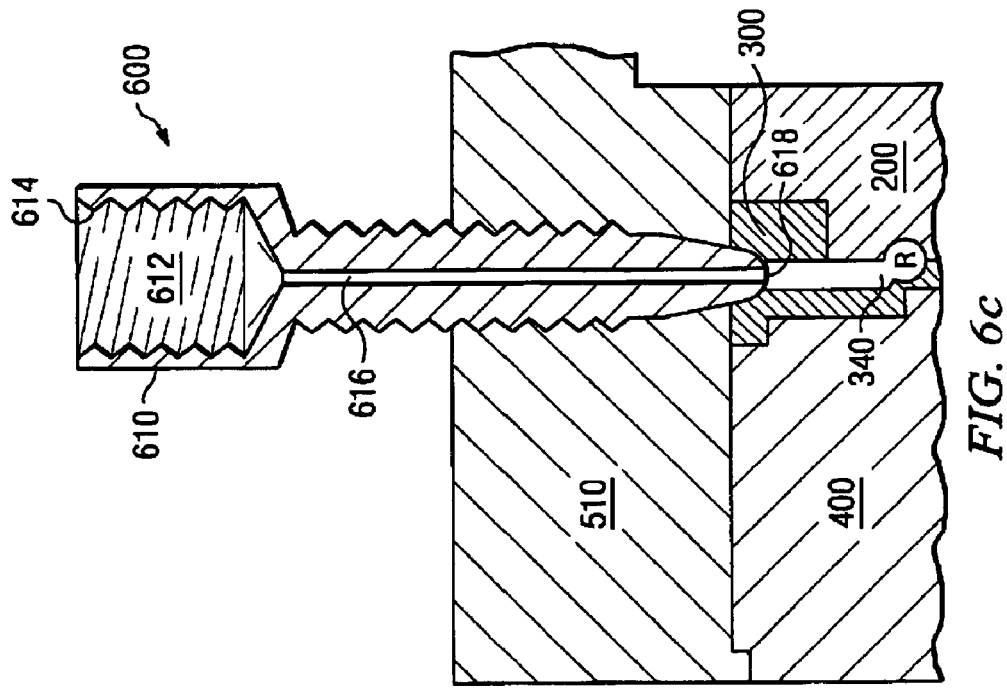
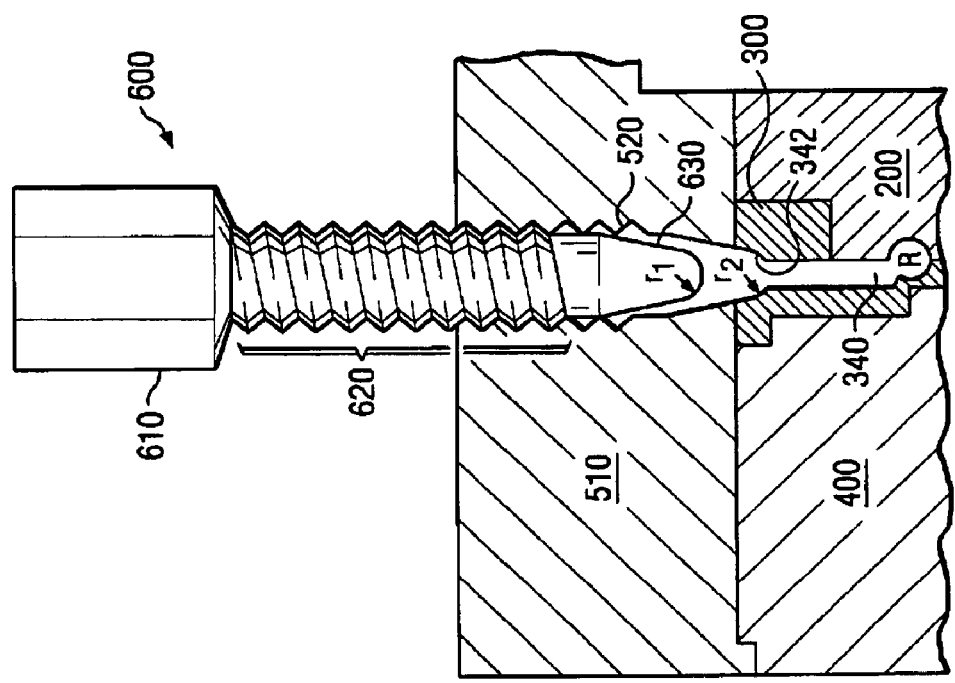

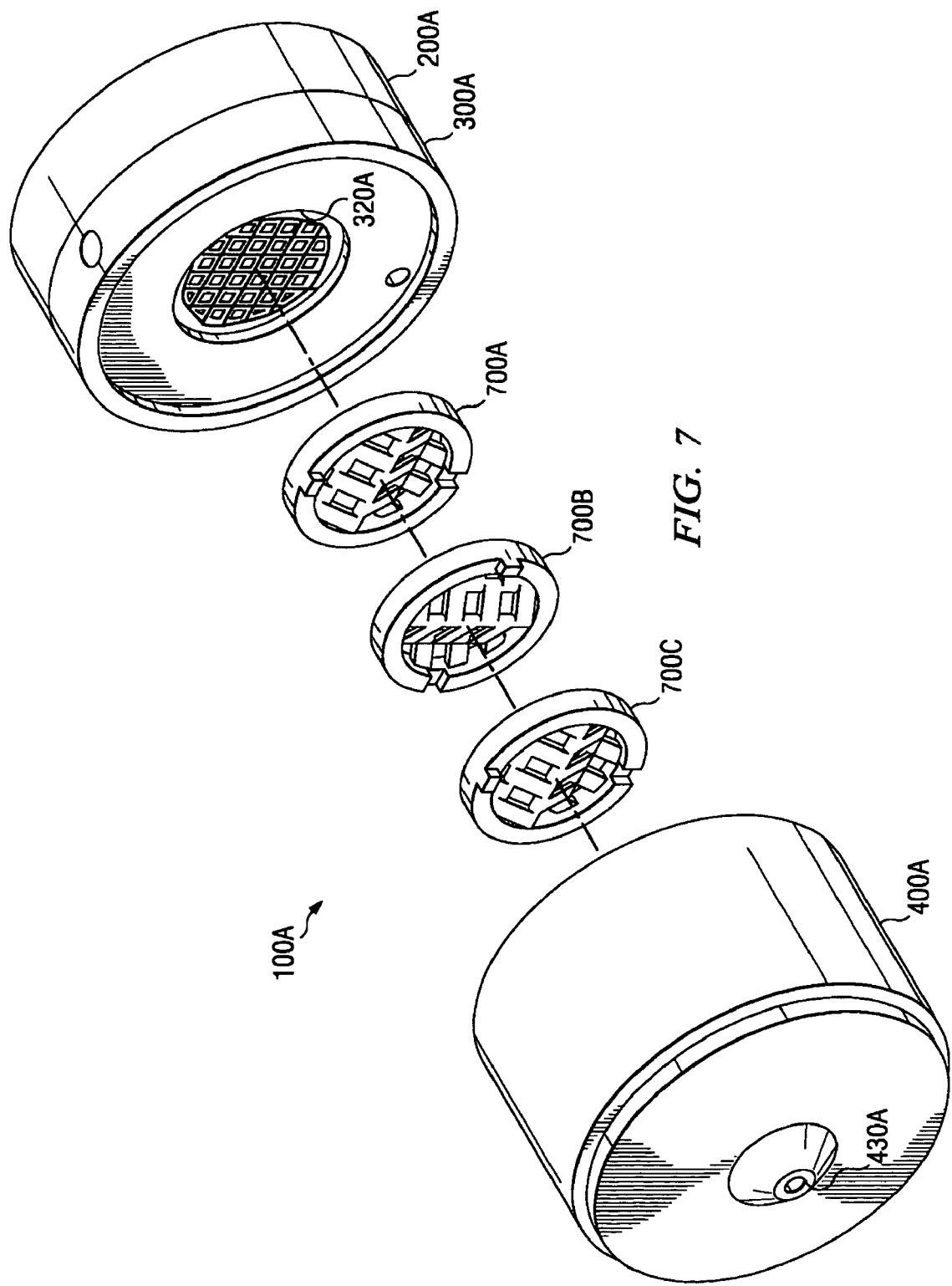

APPARATUS FOR IMPRINTING LINES ON DIRECT-EXPANDED FOOD PRODUCTS HAVING COMPLEX SHAPES WITH IMPROVED DIMENSIONAL QUALITY

CROSS-REFERENCE TO RELATED APPLICATIONS

This application is a continuation-in-part of and claims filing priority rights with respect to U.S. patent application Ser. No. 10/109,398, filed on Mar. 28, 2002 (now U.S. Pat. No. 6,783,787); Ser. No. 10/623,048 filed on Jul. 18, 2003 (now U.S. Pat. No. 6,854,970); and Ser. No. 10/622,400 filed on Jul. 18, 2003 (now U.S. Pat. No. 7,252,847). U.S. patent application Ser. No. 10/623,048 and Ser. No. 10/622,400, in turn, are each continuation-in-part applications of and claim filing priority rights with respect to U.S. patent application Ser. No. 10/047,503 filed on Oct. 29, 2001 (now U.S. Pat. No. 6,620,448). The technical disclosures of all the above-mentioned applications are hereby incorporated herein by reference.

BACKGROUND OF THE INVENTION

1. Technical Field

The present invention generally relates to the production of direct expanded (i.e., puff extruded) farinaceous food products utilizing a novel extruder die apparatus. More specifically, the present invention is concerned with an improved extruder die assembly and method for using same to add a fluid additive into an extrudable food mass while improving the dimensional quality of the resulting direct expanded food products. In particular, the improved extruder die assembly of the present invention may impart a distinct colored and/or flavored pattern into the extrudable food mass during extrusion while also improving the dimensional quality of the resulting complexly shaped direct expanded food products. The present invention also includes a method and composition for producing a dried, flavored, direct-expanded food product requiring no post-extrusion drying or seasoning process by utilizing the improved extruder die assembly.

2. Description of the Related Art

The use of extrusion devices is prevalent in a number of industries, especially the food industry. The use of extrusion devices in the preparation of direct expanded food products is long practiced. Utilized to produce a variety of products such as ready-to-eat (R-T-E) cereals, snack foods and confections, extrusion remains prominent among food processes because of its versatility and efficiency.

Food processes utilizing extrusion devices typically include an edible substance such as dough which is introduced into a device and conveyed via a screw pump to an inlet where the substance is forced through an extruder die assembly. The extruder die assembly may perform a variety of functions: it may form or shape the extrudate; it may divide the extrudate into a multiple extrudates; it may inject an additive substance into the extrudate; and it may compress and reduce the cross-sectional area of the extrudate. Examples of devices used for extrusion of food products are illustrated in U.S. Pat. Nos. 2,858,217; 3,314,381; and 5,639,485. While extrusion dies have evolved over the years, the method by which an additive substance is supplied and injected into the extrudate has remained essentially unchanged.

For Example, in U.S. Pat. No. 2,858,217 to Benson, the introduction of coloring matter, such as a colored liquid dye, is accomplished via a series of apertures 40, 42, 44 disposed in the bridging strips 32, 34, 36 and supplied by horizontal passages 52, 54, 55 which are in fluid communication with the dye reservoir 46. The supplying of the liquid dye from the dye reservoir 46 to series of apertures 40, 42, 46 is by means of gravitational force. According to the Benson '217 device, dough material 18 is extruded through a divider block 22 which forces the dough material 18 to divide or spread around the bridging strips 32, 34, 36 so that voids 38 are formed into which the coloring matter is introduced via the series of apertures 40, 42, 44.

Similarly, in U.S. Pat. No. 3,314,381 to Fries et al., the fluid injection assembly is comprised of a hollow tubular injection member 29 in a helical spiral configuration, which includes a bore 37 through which pressurized injection fluid is supplied from a source 25 to a plurality of longitudinally spaced bores 39 into a distributing channel 38. The fluid along the length of channel 38 is injected into the passing dough as a substantially longitudinally continuous spiral band extending from substantially the central axis of the dough to either the outer face of the dough or a point short thereof. However, the Fries et al. '381 device is primarily adapted to relatively low pressure comestible extrusions.

Finally, U.S. Pat. No. 5,639,485 to Weinstein et al. and its related patents, disclose a method and apparatus for adding additives in flowing dough to make complexly patterned multicolored extrudates. The Weinstein et al. '485 invention and its progeny all disclose a high pressure extrusion device comprising an extruder die insert 20 which includes means for imparting at least one interstitial gap in the flowing dough by means of a plurality of dividing passageways (e.g., 44, 45, 46) formed by die dividing members 47. An additive (e.g., a food color or a second colored dough) may be injected via a plurality or array of evenly spaced food color injection ports 48 formed on the downstream side of die dividing member 47. The injection ports 48 are in fluid communication with a pressurized color supply 18 by means of a supply ports 52, 54, 56 and supply passageway 50. The color fluid tends to fill the interstitial gaps in the flowing dough between passageways (e.g., 44, 45, 46) formed by and behind the die dividing members 47 to create a line in the shape of dividing members 47 in the extruded dough. The die insert 20 also includes notches 57 which are used to isolate the color fluid injected into the interstitial gap from spreading to the interior surface wall of die insert 20 thereby reducing if not eliminating the leakage on color fluid onto the outside of the extruded dough. Additionally, the die insert 20 can further include a means for sealing (e.g., "O" rings 60 and 62 as depicted) the color fluid supply reservoir 58 against premature admixture with dough.

In addition to the die insert element, the Weinstein et al. '485 invention also comprises a reducing passageway 25 whereby the extrudate's cross-sectional area is significantly reduced. At high operating pressures, the convergence of the passageway 25 inherently creates a significant back pressure on the downstream side of the extruder die insert 20 which, in turn, can contribute to and promote the clogging of the individual injection ports 48. Moreover, the utilization of notches 57, sealing means 60, 62 and multiple enclosed injection ports 48 further complicates the design of the die insert making it harder to clean and maintain. Finally, injecting color fluid at discrete locations into downstream voids or interstitial gaps to disperse the fluid in a generally uniform manner requires precise control of flow rates, internal pressures, and viscosity of the extrudate and various additives. Furthermore, the design of each die insert 20 is limited to the physical constraints imposed by the previously mentioned design elements.

What is needed is an extruder die assembly capable of operating at a variety of operating pressures which has improved seal characteristics and is simpler and easier to maintain and whose injection mechanism is less prone to clogging and blockages.

In addition, extrusion devices are increasingly utilized to impart heat to the base substance during its transit through the extruder device. Typically, a casing surrounding the extrusion chamber is adapted to impart heat to the substance in accordance with practices commonly known in the art. For example, cooker extruders are used to prepare cooked dough extrudates that may then be formed into individual cereal or snack pieces, and subsequently baked or fried.

One variation of cooker extruders that is increasingly popular comprises an extruder wherein the conditions of the extruder and the cooked cereal dough are such that the dough puffs immediately upon being extruded and is cut into individual puffed pieces at the die head. Such a process is referred to generally as "direct expansion" or "puff extrusion."

The flavoring of such extruded food products typically comprises either flavoring the base substance prior to its introduction to the extruder device (i.e., adding a flavoring to the base substance within the extruder device wherein it is admixed utilizing a screw pump mechanism) or flavoring the resulting extruded food piece subsequent to the extrusion process. However, inducing heat to the base substance during an extrusion process adversely affects the flavoring of the resulting extruded food product. Many flavoring are particularly sensitive to heat induced during the manufacturing process. For example, spicy flavorings (e.g., green pepper, chipotle, and jalapeño) and salty dairy flavors (e.g., cheddar cheese and sour cream) are particularly susceptible to flavor diminishment or deterioration when exposed to heat for an extended period of time during a direct expansion extrusion process. Even sweet flavorings (e.g., strawberry, chocolate, vanilla, etc.), while more heat tolerant than other flavoring, are, nevertheless, somewhat degraded when exposed to heat during the manufacturing process. Thus, the flavoring of direct expansion food products usually occurs during a separate seasoning step, which occurs subsequent to the direct expansion extrusion process. Flavorings are typically sprinkled on and admixed with a mass of direct expansion food product on a conveyor belt mechanism or in a tumbling drum mechanism. The tumbling mechanism ensures even coverage of the extruded product.

While the adverse effects caused by heat on flavorings can be avoided by utilizing an extruder mechanism which does not induce heat to the base substance during an extrusion process, the resulting flavored extruded pieces will typically still require a subsequent drying process. Moreover, the dried, flavored, extruded pieces will also have to be subsequently baked or fried, which will similarly affect adversely the quality of the flavoring.

Thus, a need also exists for a more efficient system for flavoring extruded food products during a production run of a cooker extrusion device. In this regard, it would be particularly desirable if the seasoning or flavoring of direct expanded food products could be accomplished in a one-step extrusion process (i.e., without a separate seasoning step subsequent to the extrusion process and without a substantial degradation of heat sensitive flavorings injected prior to the extrusion process).

Another problematic aspect of direct expansion or puff extrusion devices involves the dimensional quality of the resulting direct expanded food products. Upon exiting the extruder die assembly of a puff extrusion device, the extruded mass is directly expanded (e.g., via flash puffing) and typically cut into individual pieces using a reciprocating blade mechanism. The resulting individual pieces typically have a uniform, puffed shape with a cross-sectional shape generally corresponding to the outline of the forming die's exit port. While the characteristics of the resulting individual pieces are satisfactory for simple geometric shapes (e.g., spheres, ovoids, and crescents), the design details of more complex shapes tend to be obscured or eliminated.

For example, FIG. 1a shows the exit face 12 of a forming die 10 used in prior art extruder die assembly. Included within the periphery of the exit face 12 is a complexly shaped exit port 14. The outline 16 of exit port 14 is designed to resemble a hand with four distinct appendages or fingers. When the forming die 10 is utilized in conjunction with a conventional direct expanded food process, the resulting product is a uniformly puffed food piece 18 as shown in FIG. 1b. While the shape of the outline 16 of exit port 14 is somewhat discernable in food piece 18, the design details of the four distinct appendages is generally diminished and obscured. The individual dimensional aspects of the four distinct appendages are simply absorbed by the dimensional aspects of the palm area of the outline 16 of exit port 14.

A need, therefore, exists for an improved apparatus and method for imparting a distinct colored and/or flavored pattern into an extrudable food mass during the extrusion process while enhancing the quality of dimensional design aspects of extruded, complexly shaped, direct expanded food products.

SUMMARY OF THE INVENTION

The present invention overcomes many of the shortcomings inherent in prior art apparatus and methods addressing extruder die assemblies. The present invention comprises an improved extruder die assembly and method for using same to impart a distinct colored and/or flavored pattern into an extrudable food mass during the extrusion process while improving the quality of dimensional design aspects of the resulting extruded, complexly shaped, direct expanded food products.

In one embodiment, the system comprises an extruder die assembly and method for using same which includes a forming section and an injection section fabricated as a matching set. When properly aligned and coupled, the matching set forms a peripheral reservoir manifold, internal to the die assembly, through which a fluid additive may be supplied via a supply port to at least one and more preferably a plurality of capillary channels which in turn impart a distinct cross-sectional design into a flowing mass of a first extrudate.

In another embodiment, the system and method for using the present invention includes partitioning the internal peripheral reservoir manifold so that a plurality of supply ports may be used to allow different colors and/or flavors to be injected at different locations in the distinct cross-sectional design.

In another embodiment, the system and method for using same utilizes multiple matched sets of forming sections and injection sections in tandem to impart multiple pattern designs into an extrudable food mass.

In another embodiment, the system and method for using same utilizes multiple matched sets of forming sections and injection sections in tandem to impart multiple pattern designs of differing colors and/or flavors into an extrudable food mass.

In another embodiment, the system and method for using same utilizes a converging nozzle to decrease the extrudate's cross-sectional area while maintaining the distinct cross-sectional design pattern imparted into the extrudate.

Thus, in accordance with one feature of the invention, the present invention is comprised of an extruder die assembly capable of operating at a variety of operating pressures which has improved seal characteristics and is simpler and easier to maintain. Moreover, the performance of the extruder die assembly of the present invention is more stable in that surging of the fluid additive is inhibited thereby resulting in a continuous well defined pattern being injected into the extrudable food mass.

In accordance with another feature of the invention, the present invention is comprised of an extruder die assembly whose injection mechanism is less prone to clogging and blockages. The system of the present invention allows the flow of the extrudable food mass to be momentarily halted without permanently plugging the supply passageways or injection section(s).

A novel feature of the invention is an injection nozzle which supplies fluid additives from an exterior pressurized source to a supply port formed in the extruder die assembly. The subject injection nozzle exhibits superior sealing qualities in conjunction with simplicity and flexibility. The minimal affected space required to receive the subject injection nozzle allows a single extruder die assembly to have more than one supply port fashioned therein. Thus, multiple injection nozzles may be used to supply a single extruder die assembly with multiple colors and/or flavors. The injection nozzle of the present invention also exhibits a unique dual seal characteristic, which is particularly effective in conditions involving high temperature. The subject injection nozzle is also highly flexible in that one injection nozzle may be used interchangeably with another (i.e., each injection nozzle is not unique to a particular supply port).

A novel food product may also be produced in accordance with another feature of the invention, wherein a known composition of a farinaceous food product is extruded through the extruder die assembly of the present invention to produce a flavored direct-expanded food product exhibiting enhanced flavor characteristics while requiring no post-extrusion drying or seasoning process. The injection section of the extruder die assembly is used to impart flavoring additives into the extrudate mass shortly before expansion, thereby preserving the flavoring characteristics of the additive by minimizing the heat exposure of the flavoring additive. The extruder die assembly may also include static mixing elements downstream from the injection section to homogenize the flavoring or seasoning media into the flowing mass of extrudate. In particular, the present invention may be used to combine heat sensitive flavorings into a farinaceous food mixture to produce a flavored, direct expanded, farinaceous food product without the use of a drying apparatus or a seasoning step subsequent to the extrusion process.

In yet another embodiment, the improved extruder die assembly of the present invention may also include a transition insert section, a plurality of spacer insert elements, an imprinting insert element, and a forming insert element, all of which are coaxially aligned and interlocking. The improved extruder die assembly of the present invention is designed for adaptation to a wide variety of commercial-grade extrusion devices common in the food industry. The imprinting insert element includes at least one prong which, when properly configured, is aligned with a corresponding projection in the forming insert element, and momentarily disrupts the axial flow of an extrudate altering its velocity profile. By disrupting the axial flow the extrudate in close proximity to the projections in the forming insert element prior to its extrusion, the dimensional quality of the resulting direct expanded food piece is greatly improved.

The axial distance between the one or more prongs and its corresponding projection may be adjusted as necessary using spacer insert elements to optimize the dimensional qualities of the resulting food piece depending upon the particular flow characteristics of each extrudate.

In another embodiment of the present invention, the extruder die assembly includes a converging nozzle section having axially aligned ridgelines which gradually project into the bore of the nozzle as the nozzle converges to gradually disrupt the axial flow of an extrudate at specific peripheral points thereby altering the extrudate's velocity profile. By gradually disrupting the axial flow the extrudate in close proximity to the projecting ridgelines in the converging nozzle prior to its extrusion, the dimensional quality of the resulting direct expanded food piece is greatly improved. Moreover, by carefully positioning the capillary channels of the injection section into that portion of the flowing extrudate not affected by the axially aligned ridgelines, a distinct colored and/or flavored pattern may be imparted into the extrudable food mass during the extrusion process while improving the quality of dimensional design aspects of the resulting extruded, complexly shaped, direct expanded food products.

BRIEF DESCRIPTION OF THE DRAWINGS

A more complete understanding of the method and apparatus of the present invention may be had by reference to the following detailed description when taken in conjunction with the accompanying drawings, wherein:

FIG. 2b is a cut-away exploded perspective view of the extruder die assembly of the present invention shown in FIG. 2a;

FIG. 3a is an overhead view of the forming section of the extruder die assembly of the present invention shown in FIG. 2a;

FIG. 3b is a cut-away perspective view of the forming section of the extruder die assembly of the present invention shown in FIG. 3a;

FIG. 4a is an overhead view of the injection section of the extruder die assembly of the present invention shown in FIG. 2a;

FIG. 4b is a cut-away perspective view of the injection section of the extruder die assembly of the present invention shown in FIG. 4a;

FIG. 6b and 6c are enlarged sectional views of the interface between the extruder die assembly and associated injection nozzle shown in FIG. 6a;

FIG. 7 is perspective in partially exploded view of an alternate embodiment of the extruder die assembly of the present invention illustrating an integral static mixer element;

FIG. 14b is a cut-away exploded perspective view of the embodiment of the extruder die assembly of the present invention shown in FIG. 14a;

FIG. 15a is an overhead view of the inlet face of the forming section of the extruder die assembly of the present invention shown in FIG. 14a;

FIG. 15b is a cut-away perspective view of the forming section of the extruder die assembly of the present invention shown in FIG. 15a;

FIG. 16a is a cut-away perspective view of the injection section of the extruder die assembly of the present invention shown in FIG. 14a;

FIG. 16b is an overhead view of the outlet face of the injection section of the extruder die assembly of the present invention shown in FIG. 14a;

FIG. 17a is an overhead view of the inlet face of the converging nozzle section of the embodiment of the extruder die assembly of the present invention shown in FIG. 14a;

FIG. 17b is an overhead view of the outlet face of the converging nozzle section of the embodiment of the extruder die assembly of the present invention shown in FIG. 14a; and FIG. 18 depicts a perspective view of the resulting direct expanded food piece formed utilizing the embodiment of the extruder die assembly of the present invention shown in FIG. 14a.

Figure 1A:
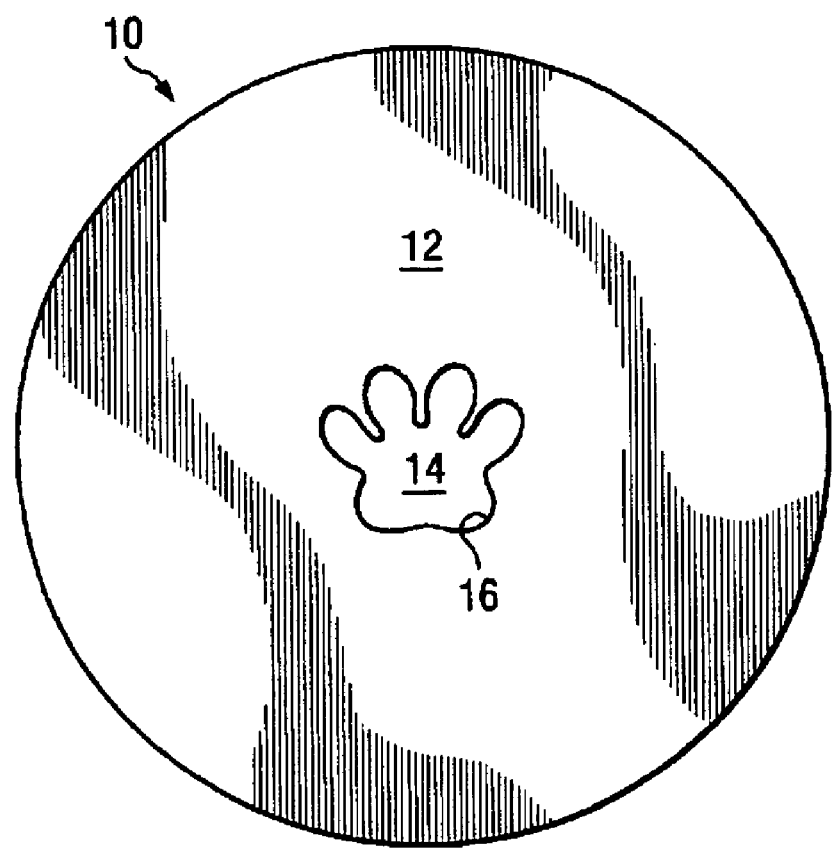
FIG. 1a is an exit face view of a forming die used in prior art extruder die assembly.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE INVENTION

Figure 2A:
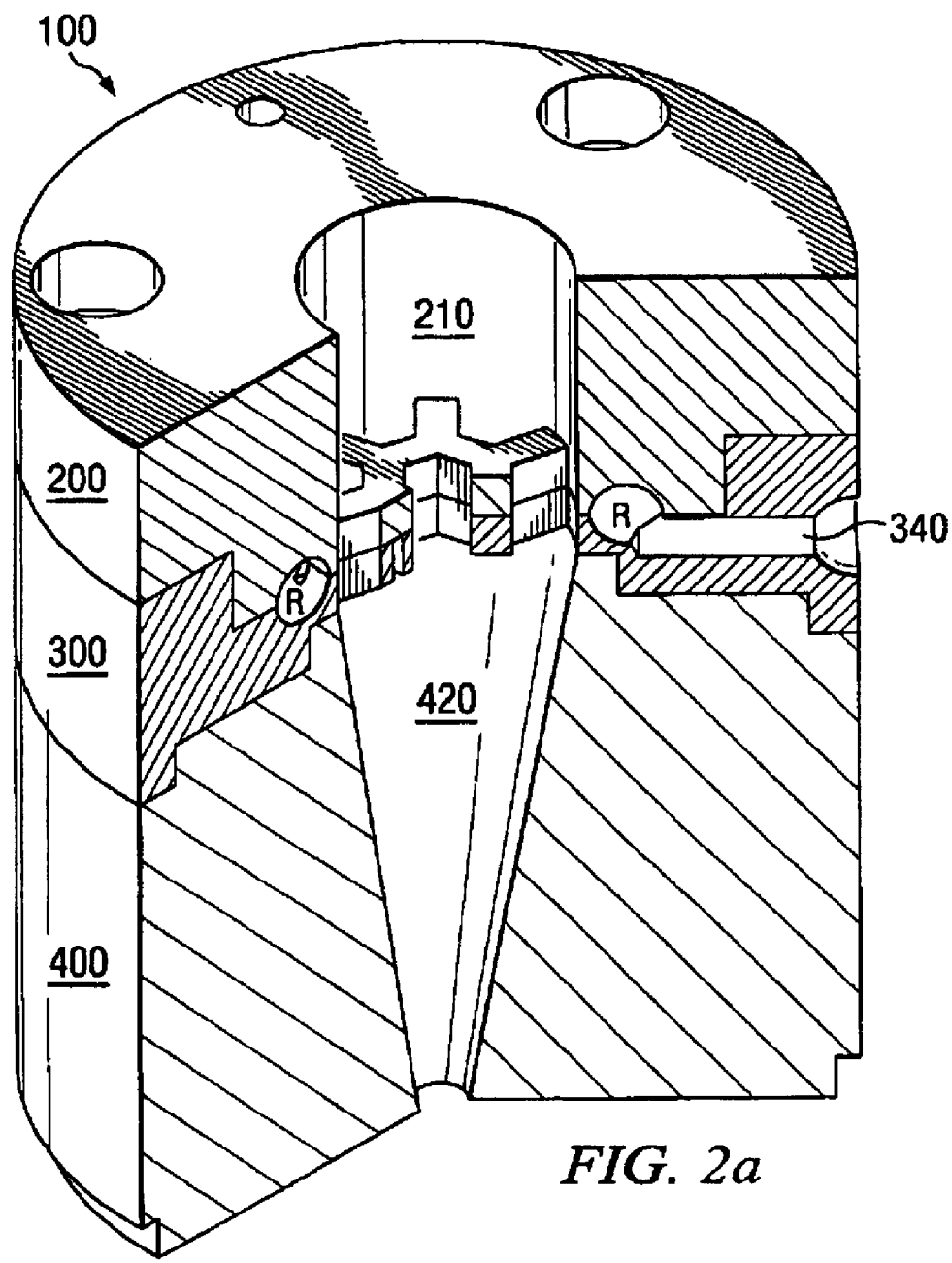
FIG. 2a is a cut-away perspective view one embodiment of the extruder die assembly of the present invention.
Figure 2B:
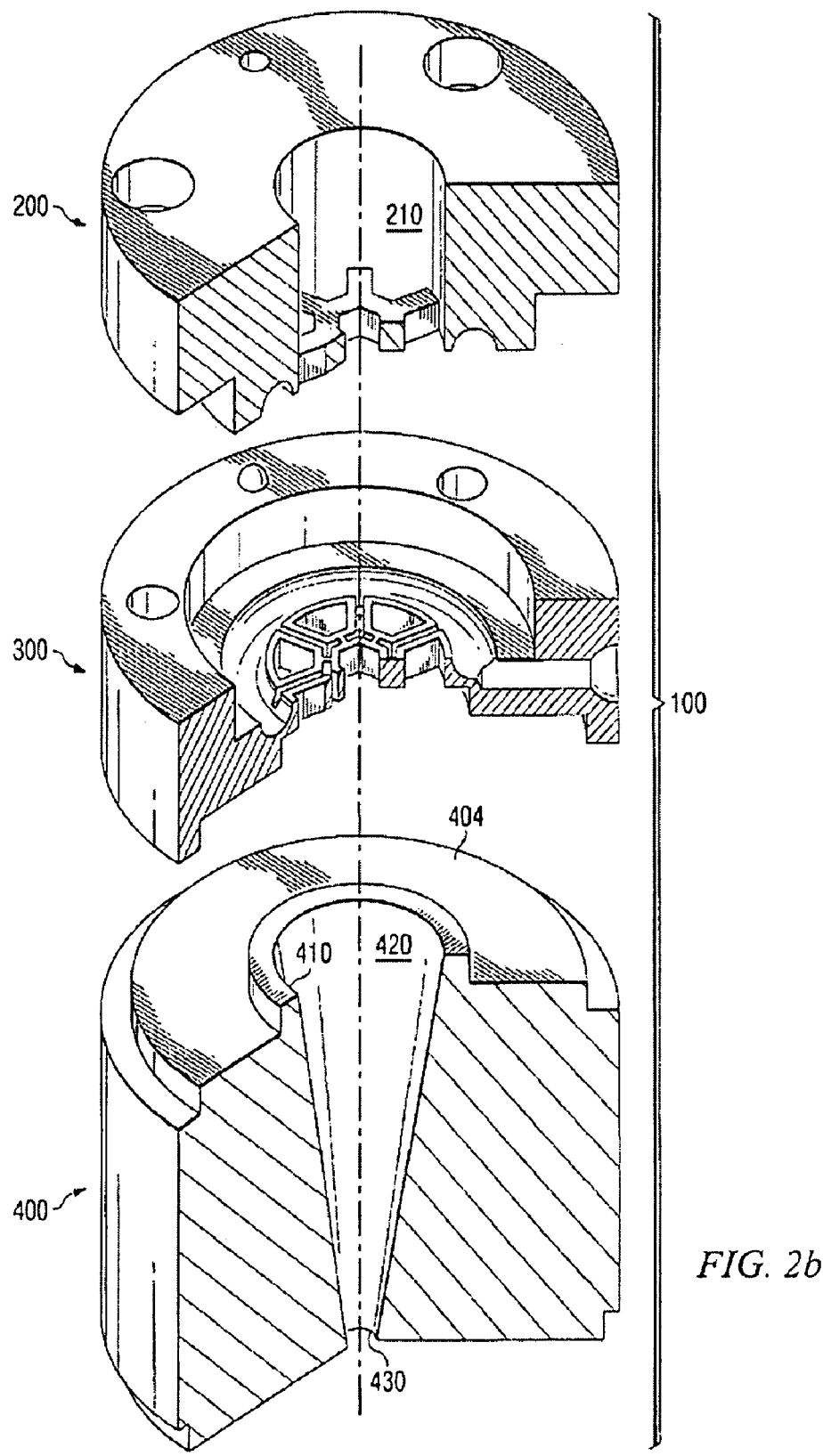

An extruder die assembly, generally indicated by reference character 100 in FIGS. 2a and 2b, includes a forming section 200, an injection section 300, and a nozzle section 400. The three sections comprising the die assembly 100 are coaxially aligned and interlocking. Additionally, means for coupling the forming section 200 to the injection section 300 are also included.

The extruder die assembly 100 is designed for adaptation to a wide variety of commercial-grade extrusion devices common in the food industry. The extruder die assembly 100 is inserted into an appropriate compartment within an extrusion device (not shown) such that a first extrudate (e.g., a paste or a cereal dough) is directed down a coaxially aligned passageway 210 within the forming section 200 and combined with a fluid additive (e.g., a food coloring dye or a flowable colored and/or flavored food material) in the injection section 300 via supply port 340 and annular reservoir R, whereupon the resulting food mass is compressed through a converging nozzle bore 420 in the nozzle section 400 to produce an extruded food product containing a distinct colored and/or flavored pattern.

While the embodiment illustrated is shown as being generally cylindrical in shape, the exterior housing of the die assembly 100 may be of any shape necessary for adaptation to commercial-grade extrusion devices common in the food industry. Similarly, while passageway 210 and bore 420 are depicted as having a circular cross sectional area, in other embodiments, passageway 210 and bore 420 can be fabricated with a more complex peripheral configuration to define or define in part the exterior shape or configuration of the finished piece, including both regular shapes (e.g., stars, rings, geometric shapes) as well as irregular shapes (e.g., animals, vegetables, objects such as trees, cars, etc.).

Figure 3A:
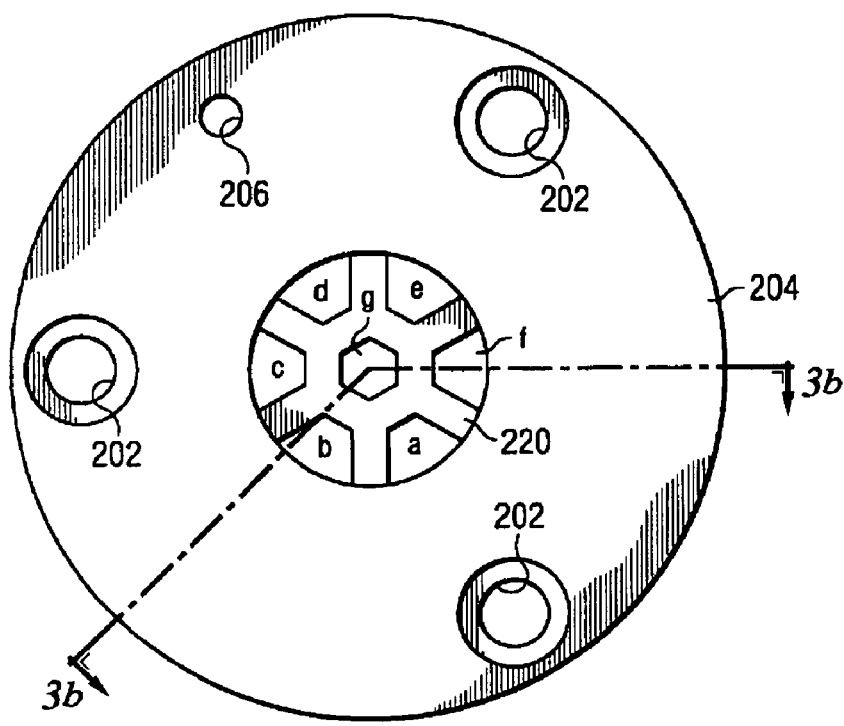
Figure 3B:
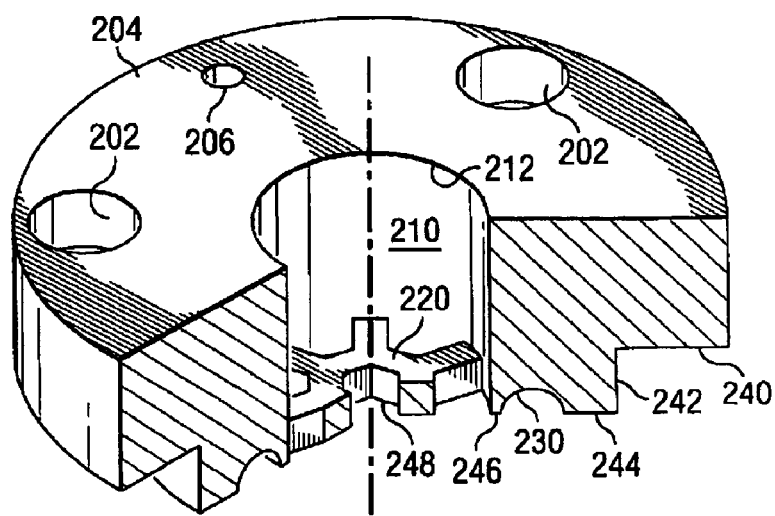

Referring to the figures, and in particular FIGS. 3a and 3b, the forming section 200 is a generally tubular flange element having a central bore defining a passageway 210. The inlet 212 of the passageway 210 is adapted to receive a conduit (not shown) supplying a pressurized first extrudate from an extrusion device (not shown). A plurality of counter-sunk coupling holes 202, equally spaced around the periphery of the entrance face 204 of forming section 200, are provided for receiving screws (not shown) for removably coupling the forming section 200 to threaded holes 302 in the injection section 300. An alignment hole 206 extends through the forming section 200 in parallel alignment with the passageway 210 to receive an alignment knob 306 on the entrance face 304 of the injection section 300. When properly seated into the alignment hole 206, the alignment knob 306 ensures that the axial angular alignment of the injection section 300 in relation to the forming section 200 is correct.

The outlet portion of the passageway 210 includes a forming die element 220 which divides the flow of the first extrudate into at least two, and more preferably a plurality of adjacent flowing extrudate passageways such as passageways a-g respectively formed by forming die element 220.

The forming section and injection section are fabricated as a matching set. In general, the outlet portion of the forming section is designed to mate and seal with the inlet portion of the injection section. In one embodiment, an inner peripheral rim formed in the outlet portion of the forming section is specifically designed to slidably couple and align with a central bore in the inlet portion of the injection section. The inner peripheral rim is defined by a peripheral notch formed in the outlet face of the forming section. The peripheral notch is characterized by a peripheral rim wall which is parallel with and generally equidistant from the outer periphery of the central passageway. The inner peripheral rim includes a peripheral groove with a semicircular cross-section. A matching peripheral groove with a semicircular cross-section is formed in the base of the central bore of the inlet portion of the injection section such that when the forming section and injection section are slidably coupled and aligned, an internal peripheral reservoir manifold with a circular cross-section is formed.

Figure 4A:
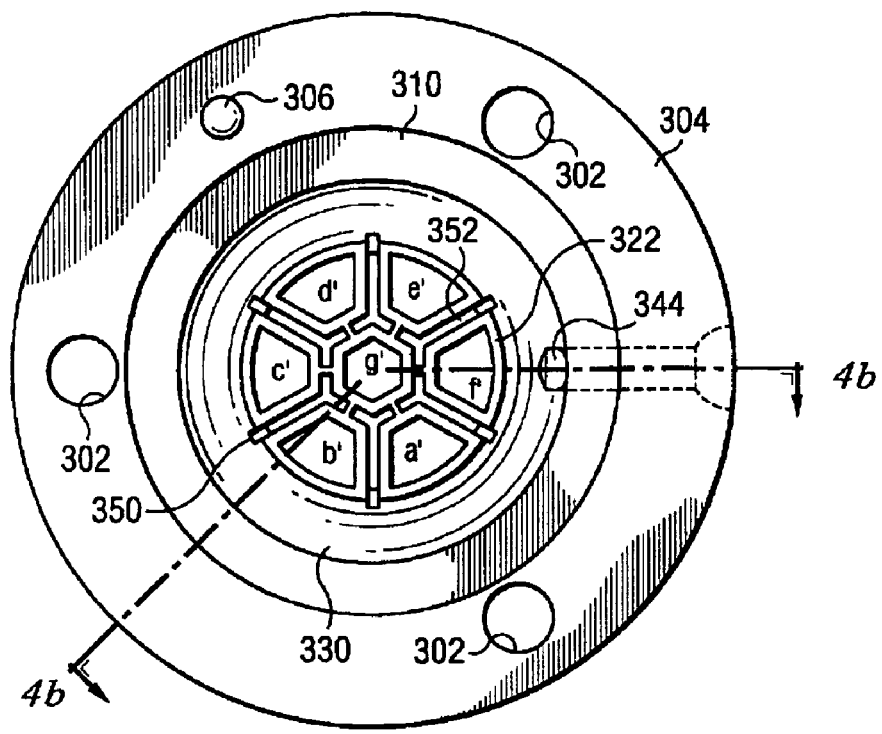
Figure 4B:
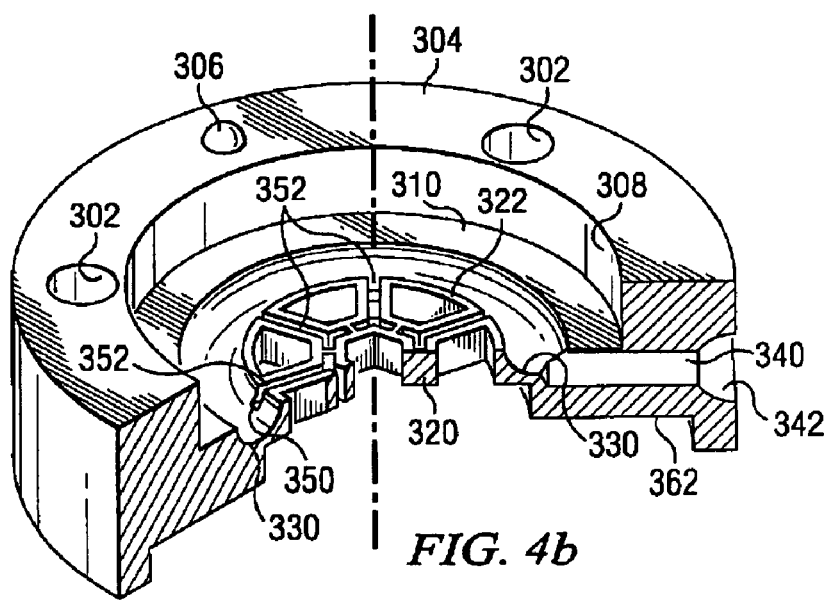

Thus, as shown in the figures, and in particular FIGS. 3b, 4a, and 4b, when the present invention is realized in an embodiment having a generally circular cross section, the inner peripheral run formed in the outlet portion of the forming section 200 is an annular rim defined by an annular notch, characterized by the annular rim wall 242 and the annular outer ring seal face 240, around the outer periphery of the outlet face of the forming section 200. The annular rim in the outlet portion of the forming section 280 slidably fits into a central bore in the inlet portion of the injection section 300 defined by the annular bore wall 308 such that the forming section's annular outer ring seal face 240 seats and seals with the injection section's annular outer seal face 304, the forming section's intermediate annular seal face 244 seats and seals with the injection section's annular intermediate ring seal face 310, and the forming section's inner annular seal face 246 and the exit face 243 of the forming die element 220 seat and seal with the entrance face 322 of the injection section's co-injection die insert 320. Moreover, the matching annular peripheral grooves 230 and 330 form an annular internal peripheral reservoir manifold R into which a fluid additive may be supplied by means of outlet 344 of supply port 340. When properly aligned and coupled, the respective annular seals between the forming section 200 and the matching injection section 300 effectively seal and isolate the fluid additive supplied to the reservoir manifold R from inadvertent leakage to the upstream side of the forming die element 220 and the outer periphery of the extruder die assembly 100.

The injection section 300 includes a co-injection die insert 320 which has profile such that when properly aligned with the forming die element 220, passageways a'-g' are respectively adjoined with passageways a-g formed by forming die element 220. When properly aligned and coupled, the seal between the exit face 248 of the forming die element 220 and the entrance face 322 of the injection section's co-injection die insert 320 ensures that the respective adjacently flowing extrudate passageways are unobstructed and contiguous and that the fluid additive contained in the reservoir manifold R does not inadvertently leak to the upstream side of the forming die element 220.

The co-injection die insert 320 includes at least one and more preferably a plurality of capillary channels 352 in the space between the plurality of passageways. The capillary channels 352 are fluidly connected to the reservoir manifold R via channel ports 350. The reservoir manifold R is fluidly connected to a pressurized source of fluid additive (not shown) via supply port 340.

When properly aligned and coupled, the seal between the exit face 248 of the forming die element 220 and the entrance face 322 of the injection section's co-injection die insert 320 ensures that the pressurized fluid additive supplied to the annular internal peripheral reservoir manifold R continually charges the capillary channels 352 via channel ports 350 whereupon each capillary channel 352 emits at its downstream exit face a continuous discharge of fluid additive in the general cross-sectional shape of the capillary channel 352 resulting in a continuous band of fluid additive being injected into the transient clefts formed in the first extrudate as it exits the adjacent flowing extrudate passageways such as passageways a'-g'. Upon exiting from the individual adjacent flowing extrudate passageways (e.g., passageways a'-g'), the individual adjacently flowing columns of first extrudate coalesce to enclose the injected bands of fluid additive within a single flow mass thereby imparting a distinct colored and/or flavored pattern into the food mass.

In an alternative embodiment of the present invention, the injection section 300 may include multiple supply ports 340 fluidly connected to separate pressurized sources of fluid additive. In such an embodiment, the annular internal peripheral reservoir manifold R may be divided into multiple segregated quadrants fluidly connecting individual pressurized sources of fluid additive to specific capillary channels 352 allowing a distinct pattern of multiple colors and/or flavors to be imparted into the food mass.

In one embodiment of the present invention, the exit face 362 of the injection section 300 is generally designed to mate and seal with the inlet face 404 of the nozzle section 400. With the exception of the co-injection die insert 320, the inlet face 404 of the nozzle section 400 is essentially a mirror image of the exit face 362 of the injection section 300. In general, the nozzle section 400 includes an inlet with a periphery matching the periphery of the forming section's passageway. The nozzle section further includes a passageway coaxially aligned with the forming section's passageway which converges to an outlet. As the passageway converges, the passageway's cross-sectional decreases while its aspect ratio is generally maintained. Thus as shown in the figures, and in particular FIGS. 2b and 4b, when the present invention is realized in an embodiment having a generally circular cross section, the nozzle section 400 includes an inlet 410 with an inner annular periphery which matches the periphery of the forming section's passageway 210. The nozzle section further includes a passageway 420 coaxially aligned with the forming section's passageway 210 which converges to an outlet 430.

Figure 1B:
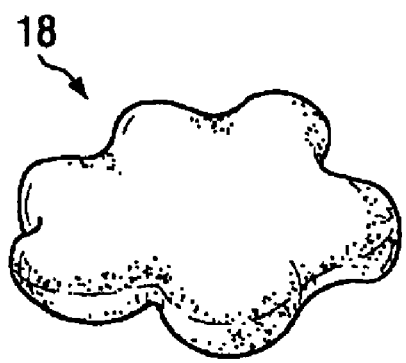
FIG. 1b depicts the resulting direct expanded food piece formed by utilizing the forming die shown in FIG. 1a in a conventional direct expanded food process.

In an actual embodiment having a circular cross section as illustrated in FIG. 1b, the diameter of converging nozzle bore passageway 420 is reduced from 0.664 inches at inlet 410 to 0.332 inches at outlet 430, wherein the cross-sectional area of the converging nozzle bore 420 is reduced by a factor greater than 4:1 between the inlet and the outlet of the extrusion nozzle bore. In another such embodiment, the diameter of converging nozzle bore passageway 420 is further reduced from 0.664 inches at inlet 410 to 0.153 inches at outlet 430, wherein the cross-sectional area of the converging nozzle bore 420 is reduced by a factor less than 20:1 between the inlet and the outlet of the extrusion nozzle bore.

Alternatively, in another embodiment of the present invention, multiple sets of matching forming/injection sections may be adjoined in a tandem or series arrangement. In such an embodiment, the inlet face of a second set's forming section is designed to mate and seal with the exit face of a first set's injection section. Arranging multiple sets of matching forming/injection sections in tandem allows multiple pattern designs of differing colors and/or flavors to be imparted into an extrudable food mass.

Figure 5:
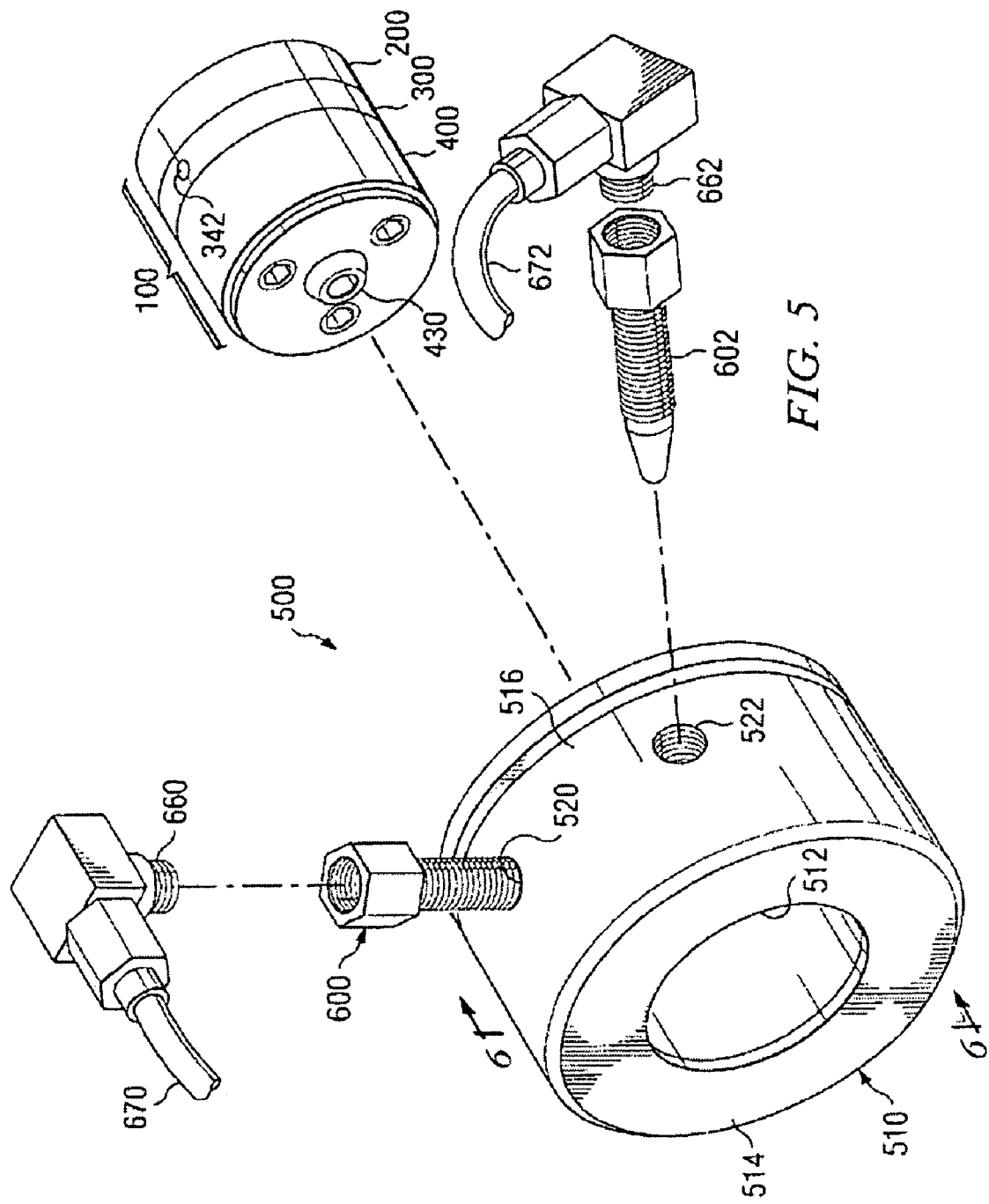
FIG. 5 is a perspective in partially exploded view of the exit face of a die plate assembly attached to a food cooker extruder showing an embodiment of the extruder die assembly of the present invention and associated injection nozzle assemblies.

As previously noted, the extruder die assembly 100 of the present invention is designed for adaptation to a wide variety of commercial-grade extrusion devices common in the food industry. The extruder die assembly 100 is typically inserted into a sealable compartment attached to or within an extrusion device (not shown), such that the inlet 212 of the forming section 200 of the extruder die assembly 100 is connected via a conduit to an output port of the extrusion device. For example, as illustrated in FIG. 5, such a compartment may comprise a die plate assembly 500 attached to the outlet section of a conventional cooker extruder device. The die plate assembly 500 includes a main die plate 510 having a main bore 512 defined therethrough for receiving an extruder die assembly 100. The circumferential dimensions of the main bore 512 is complementary to that of the extruder die assembly 100, so as to ensure a snug fit and minimal extrudate leakage therebetween. When an extruder die assembly 100 is inserted into the main bore 512 of the main die plate 510, the outlet 430 of the nozzle section 400 protrudes slightly past the exit face 514 of the main die plate 510.

The main die plate 510 also includes an injection port 520 formed in the sidewall 516 of the main die plate 510 for receiving an injection nozzle 600. The injection port 520 extends through the sidewall 516 to the main bore 512 at an angle generally perpendicular to the longitudinal axis of main bore 512. The injection port 520 is further positioned such that when an extruder die assembly 100 is inserted into and properly aligned with the main die plate 510, the injection port 520 aligns with a corresponding supply port inlet 342 formed in the injection section 300 of the extruder die assembly 100. The main die plate 510 may further include additional injection ports (e.g., 522) for receiving additional injection nozzles (e.g., 602), for use with an extruder die assembly 100 having multiple supply port inlets 342 formed in the injection section 300 thereof. When not required, the additional injection ports (e.g., 522) may be sealed with a suitable plug device (not shown).

In addition, the die plate assembly 500 also typically includes a conventional feed plate (not shown) which seals the entrance face of the main die plate 510 and has a passageway defined therethrough which acts as a conduit between the output port of the extrusion device and the inlet 212 of the forming section 200 of the extruder die assembly 100. The feed plate may also provide attachment points for connecting the die plate assembly 500 to the outlet section of the extrusion device.

Figure 6A:
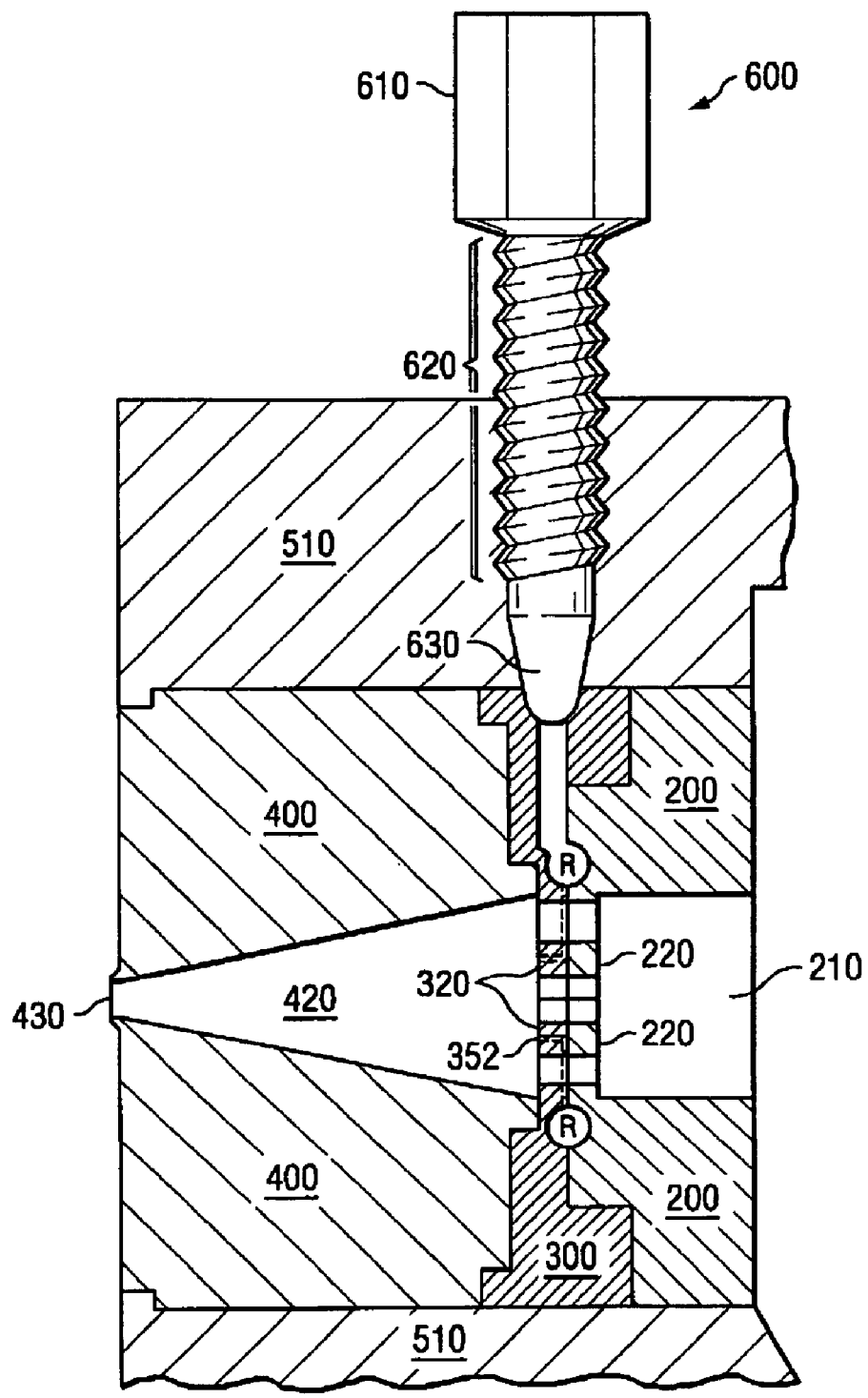
FIG. 6a is a partial sectional view of the die plate assembly taken along lines 6-6 in FIG. 5, showing an embodiment of the extruder die assembly and injection nozzle of the present invention properly aligned and inserted therein.

Referring now to the Figures, and in particular to FIGS. 6a, 6b and 6c, which depict various cross-sectional views of the die plate assembly illustrated in FIG. 5, a novel feature of the invention is shown, which comprises an injection nozzle 600 that supplies fluid additives from an exterior pressurized source to a supply port 340 formed in the injection section 300 of the extruder die assembly 100. The injection nozzle 600 of the present invention exhibits enhanced sealing characteristics while supplying pressurized fluid additives to an extruder die assembly 100 inserted in a die plate assembly attached to a conventional cooker-extruder device.

The injection nozzle 600 generally comprises an inlet section 610, a mid-section 620, and a outlet section 630. The inlet section 610 is designed to receive and couple with a pressurized additive supply line 670, 672 so as to establish fluid communication with the exterior pressurized source. In the embodiment shown in the Figures, the inlet section 610 comprises a standard hexagonal NPT threaded female fitting which is designed to engage a conventional threaded male fitting 660, 662 attached to the pressurized additive supply line 670.

The mid-section 620 comprises an externally threaded barrel having a smooth-bore interior passageway 616 in fluid communication with an inlet space 612 defined in the inlet section 610. The threaded mid-section 620 allows the injection nozzle 600 to be securely mounted into the threaded injection port 520 formed in the main die plate 510, thus forming a leak-proof assembly.

The outlet section 630 comprises a smooth, tapered end having a discharge port 618 at its distal end which is in fluid communication with the interior passageway 616. The diameter of the discharge port 618 is typically less than the diameter of the supply port 340. The outlet section 630 is generally paraboloididal shaped having a spherical tip of a given radius $r_1$. The spherical tip of the outlet section 630 is complementary with the spherical concavity of a given radius $r_2$ which defines the supply port inlet 342 formed in the injection section 300 of the extruder die assembly 100. The complementary shapes of the spherical tip of the outlet section 630 and the supply port inlet 342 provide a relatively larger contact area per unit volume of perforation inside the injection section 300 of the extruder die assembly 100, thereby resulting in an enhanced sealing mechanism. The resulting increase in the metal-to-metal contact between the outlet section 630 of the injection nozzle 600 and the supply port inlet 342 thereby facilitates a non-invasive fluid connection with robust sealing characteristics.

Thus, in addition to the threaded portion 614 of the inlet section 610, which effectively seals the connection between the injection nozzle 600 and the pressurized additive supply line 670, the injection nozzle 600 of the present invention exhibits a unique dual seal characteristic. First, the threaded mid-section 620 effectively seals the injection port 520 preventing extrudate from leaking out from the interior main bore 512. Second, the complementary shapes of the spherical tip of the outlet section 630 and the supply port inlet 342 effectively seals the pressurized fluid additives from leaking out to the outer periphery of the extruder die assembly 100.

The dual seal characteristic is particularly effective in conditions involving high temperature. In such conditions, components of the die plate assembly 500 typically expand, oftentimes resulting in a corresponding increase in the gap between the extruder die assembly 100 and the interior main bore 512. The dual seal characteristic of the injection nozzle 600 allows both sealing mechanisms to be adjusted, independent of one another, in response to changes induced by high temperature conditions.

Furthermore, the injection nozzle 600 of the present invention promotes a simpler and more flexible injection system. For example, while in theory a sealing thread mechanism could be extended along the entire length of the nozzle, this would require a much larger volume of perforation inside the injection section of an extruder die assembly to achieve an equivalent contact and sealing area. Moreover, to insure a continuous threaded seal, the bore of the injection port and the supply port inlet would have to be threaded concurrently, thereby dictating a matched set arrangement comprised of an injection nozzle, an injection section, and a die plate.

On the other hand, the reduced injection section perforation requirement of the injection nozzle 600 of the present invention allows greater flexibility in the number of nozzles used and the positioning of the nozzles in a particular application. Moreover, the injection nozzle 600 of the present invention allows greater simplicity while improving the flexibility of the entire system in that generic components may be fashioned so as to be essentially interchangeable with like generic components. For example, the injection nozzle 600 may standardized so as to be interchangeable with any other generic injection nozzle. The dimensions and position of the supply port inlet 342 formed in assorted injection sections may also be standardized allowing a generic injection nozzle having a standardized tip to be used with all of them. In addition, the dimensions of the threaded injection ports on the main die plate may be standardized so as to accommodate all injection nozzles having a generic threaded barrel mid-section. Likewise, the position of the threaded injection ports on the main die plate may be standardized so as to align with the supply port inlet 342 on all extruder die assemblies having a generic injection sections. Thus, by standardizing the injection nozzle 600, the injection port 520, and supply port inlet 342, extruder die assemblies having different forming die elements 220 and co-injection die inserts 320 are easily interchangeable with one another.

While the embodiment of the injection nozzle 600 illustrated in the Figures is shown as a unitary component, it is understood that other variants of the injection nozzle 600 of the present invention may be comprised of separate sections which are selectively coupled to one another.

In yet another embodiment of the present invention, a known extrudate composition of a farinaceous food product is extruded through the extruder die assembly 100 to produce a flavored direct-expanded food product that exhibits enhanced flavor characteristics requiring no post-extrusion drying or seasoning process. The production of a flavored extruded food product requiring only minimal post-extrusion processing for drying and seasoning is very appealing because of the obvious simplification in the manufacturing process. An essential feature of this embodiment of the invention is the ability to add a flavoring additive in a one-step, direct-expanded extrusion process without substantially degrading the flavoring characteristics of the additive.

U.S. Pat. No. 4,869,911 to Keller, the technical disclosure of which is hereby incorporated herein by reference, discloses a composition of farinaceous food product that is well suited for use as the flowing mass of a first extrudate in the present invention. Such an extrudate composition comprises a fluid farinaceous food mixture containing from about 5 weight percent to about 17 weight percent of at least one plasticizer selected from monosaccharides, polysaccharides, and edible alcohols, including ethanol and glycerol, and having a moisture content from about 9 weight percent to about 17 weight percent.

The food material which may be used in the process of the invention can be any farinaceous material. The material will generally be in granular or powdered form such as meal, flour, or starch derived from corn, wheat, rice, oats, barley, potatoes, rye, tapioca, and other cereal crops, legumes or tubers. The preferred farinaceous material is corn meal. The granular or powdered farinaceous food mixture used in the process contains between about 9 weight percent and about 17 weight percent moisture, based on total weight of the mixture. The farinaceous material, as it is provided from a flour milling operation, usually contains sufficient moisture to provide this level. However, if necessary, a small amount of water can be added to achieve the desired level.

The plasticizer is selected from the group consisting of monosaccharides, polysaccharides, edible alcohols and mixtures thereof. Mixtures of polysaccharides employed preferably have a substantial portion of this mixture consisting of mono-, di-, and tri-saccharides. Useful monosaccharides include, for example, glucose (dextrose) and fructose. The useful polysaccharides include disaccharides, such as sucrose and maltose, and mixtures of various chain length saccharides, such as corn syrup solids, maltodextrins, and polydextrose. The useful edible alcohols include ethanol and glycerol.

It is preferred to use plasticizers selected from the group consisting of sucrose, corn syrup solids, maltodextrin, polydextrose, and glycerol. Corn syrup solids of varying dextrose equivalents (DE) have been used successfully. One embodiment of the subject invention uses Maltrin® M365 (DE 36) manufactured and sold by Grain Processing Corporation of Muscatine, Iowa which contains about 50% saccharides of chain length of 3 saccharide units or less. However, other polysaccharide mixtures having other dextrose equivalents may be used. For example, FRO-DEX® Z 24 (DE 28) manufactured by American Maize-Products Company of Hammond, Ind. contains about 25% mono-, di-, and tri-saccharides and FRO-DEX® 42 (DE 42) contains about 45% mono-, di-, and tri-saccharides. Both of these have performed similarly when compared with the Maltrin® M365. The particular choice of plasticizer may depend on a number of practical factors, including cost and the flavor desired in the end product. Since the expanded farinaceous product may be combined with a salty flavoring (e.g., a savory cheese flavoring), it is often desired that the farinaceous product have a minimal amount of sweetness. Large amounts of sucrose, dextrose, or fructose should be avoided in such case. Corn syrup solids or maltodextrins, on the other hand, are only slightly sweet and polydextroses are essentially non-sweet. Glycerol has a slight sweetness, but its flavor is generally not considered agreeable when used at relatively high concentrations.

For producing a low-sweetness, direct-expanded farinaceous product, a mixture containing from about 4.0% to 6.0% corn syrup solids, from about 0.5% to 2.0% sucrose, from about 3.0% to 6.0% polydextrose and from about 0.5% to 2.5% glycerol, is preferred as the employed plasticizer component, based on the total weight of the farinaceous food mixture which is fed to the extrusion device.

The following example is intended to further illustrate the known extrudate composition of the invention and is not intended to limit the scope of the invention in any way.

Example

A non-sweet, whole wheat flavored product was prepared from the following ingredients:

| Ingredients | Parts By Weight |
| --- | --- |
| Whole Wheat Flour | 58.09 |
| Corn Cones (Corn Meal) | 28.00 |
| Corn Syrup Solids (Dextrose Equivalent = 34-38) | 5.00 |
| Polydextrose | 3.70 |
| Sucrose | 1.20 |
| Glycerol | 2.50 |
| Salt | 0.50 |
| Monoglycerides | 0.30 |
| Annatto Powder | 0.01 |
| Water | 0.70 |
| | 100.00 |

Whereas the preceding is directed to the preparation of low sweetness expanded farinaceous products, this invention may also be used for the preparation of moderate to high sweetness expanded farinaceous products. This can be accomplished by using higher levels of the sweeter tasting plasticizers, such as sucrose, fructose, and glucose or other sweeteners known to those skilled in the art. In this case, the sweeter tasting plasticizers can be used alone or in combination with the less sweet plasticizers at levels of from about 6.0 weight percent to about 15.0 weight percent.

If desired, other conventional additives can be present in the farinaceous food mixture. For example, emulsifiers, salt, fats, food dyes and flavorings may be present in the mixture in the amounts necessary to provide a desired effect.

Thus, in accordance with the general parameters of the present invention, the known extrudate composition is extruded in a standard twin- or single-screw extrusion device fitted with the extruder die assembly 100. A flowing mass of the known extrudate composition is directed to the inlet 212 of the passageway 210 within the forming section 200 and combined with a flavored fluid additive (i.e., a flavoring and/or flavored food material) in the injection section 300. The flavored fluid additive may comprise a heat sensitive flavoring (e.g., spicy flavorings such as green pepper, chipotle, and jalapeño; or salty dairy flavors, such as savory cheese and sour cream) or a heat tolerant flavoring (e.g., sweet flavorings such as strawberry, chocolate, vanilla, etc.). While heat tolerant flavorings are less susceptible to the adverse effects of heat induced during the manufacturing process, they can, nevertheless, benefit from the method of the present invention in that overall flavor loss is reduced producing a higher intensity of flavor at reduced concentrations.

While the extruder die assembly of the present invention is capable of imparting flavored fluid additive in a distinct flavor pattern in the flowing mass of the known extrudate composition, the extruder die assembly may be constructed so as to maximize the amount of flavored fluid additive that may be imparted into the flowing extrudate composition with no regard for any corresponding pattern. For example, as shown in FIG. 7, in a preferred embodiment the extruder die assembly 100A may comprise co-injection die insert 320A featuring a cross-hatched design. The cross-hatch design maximizes the amount of flavored fluid additive imparted into the cross-section of the flowing extrudate. The extruder die assembly 100A may also include static mixing elements (e.g., 700A, 700B, 700C) located downstream from the co-injection die insert 320A of the injection section 300A. The static mixing elements (e.g., 700A, 700B, 700C) serve to homogenize the flavoring or seasoning media throughout the flowing mass of extrudate. The inlet of the nozzle section 400A may be adjusted to accommodate the inclusion of static mixing elements (e.g., 700A, 700B, 700C) within the extruder die assembly 100A.

After passing through the injection section 300A and any static mixing elements (e.g., 700A, 700B, 700C), the resulting flavored food mass is then compressed through a converging nozzle bore in the nozzle section 400A such that the pressure in nozzle bore is equal to or in excess of the vapor pressure of the water in the flavored extrudate mixture, and flavored extrudate mixture through a profile die (e.g., outlet 430A) into a zone of ambient pressure below the vapor pressure of the water in the mixture. As the flavored extrudate mixture emerges from the die into the zone of reduced pressure, a portion of the water in the mixture is vaporized, thereby causing the product to expand. The resulting extruded flavored food product has a moisture content from about 4 weight percent to about 8 weight percent and a water activity ($A_w$) from about 0.30 to about 0.45.

The extrusion device of the present invention must be capable of generating super-atmospheric pressures and elevated temperatures in the material being extruded. Preferably, the extruder employed is a twin screw extruder. The twin screw extruder houses two adjacent, parallel screws which are operated in a co-rotating mode. Suitable twin screw extruders can be obtained commercially and include, for example, a Baker-Perkins model MPF-50D twin screw extruder.

In the practice of this invention, it is preferred to employ a screw configuration which imparts relatively low shear forces to the farinaceous food material. A preferred screw for use in conjunction with a Baker Perkins MPF-50D twin screw extruder has the following configuration, proceeding from the inlet of the extruder barrel towards the extruder die assembly 100A:

First, a 10" long metering screw;
Second, a 3½" long 30° forward paddle section;
Third, a 3" long single lead screw;
Fourth, a 2" long 60° forward paddle section;
Fifth, a 6" long single lead screw;
Sixth, a 2" long 60° forward paddle section;
Seventh and last, a 3" long single lead screw.

The farinaceous food mixture is placed in a feed hopper which feeds the extruder barrel. As the mixture is moved through the extruder barrel by the action of the rotating extruder screws, the farinaceous food mixture becomes plasticized and flowable. The heat required to plasticize the mixture is generated by the shearing action of the screws. Heating and cooling devices can also be mounted along the extruder to impart or remove heat in order to obtain the desired temperature profile.

As the farinaceous food material moves through the extruder barrel, the barrel pressure increases. The pressure in the extruder barrel equals or exceeds the vapor pressure of the water in the farinaceous food mixture at all times, thus preventing the water from vaporizing prior to emergence from the extruder.

The plasticized farinaceous food mixture exits the extruder barrel and is directed to the inlet of the passageway within the forming section 200A and combined with a fluid additive (i.e., a flavoring and/or flavored food material) in the injection section 300A and extruded through outlet 430A of nozzle section 400A.

The hot, plasticized, farinaceous food mixture emerges from the outlet 430A into a zone of ambient pressure below the vapor pressure of the water in the mixture; that is, normal atmospheric pressure. Upon emerging from the extruder die assembly 100A, the now flavored plasticized, farinaceous food mixture is exposed to the reduced pressure environment, thus readily allowing a portion of the water in the mixture to vaporize so that there is formed a highly porous, puffed, cellular body. In the process of so doing, the residual moisture in the farinaceous product is reduced to a level from about 4 weight percent to about 8 weight percent.

Any suitable die configuration can be employed, depending on the particular product which one desires to make by the process of the invention. For example, as shown in the FIG. 7, the outlet 430A of extruder die assembly 100A may have a circular cross-sectional area or an "O"-shaped opening to produce a rod of extrudate or ball-shaped extrudate.

As previously indicated, the resulting extruded food product does not require the use of a drying apparatus such as an oven to remove moisture. As it emerges from the outlet 430A of the extruder die assembly 100A, the extrudate typically has a temperature from about 121° C. to about 163° C. and is soft, yet self-supporting. The product can be subjected to further processing, e.g., segmenting and bagging, etc., as soon as it has cooled sufficiently to become rigid and dimensionally stable. If desired, air cooling or other means may be employed to assist in cooling the extrudate. By eliminating the drying and seasoning stage from the production process, the total length of a production line, excluding the extruder, for an expanded, farinaceous food product is typically reduced from about 130 feet to 30 feet or less.

The expanded product is usually cooled to near ambient temperature in about two minutes. The texture is crisp and crunchy, even though a drying oven was not used. Thus, the resulting extruded food product is suitable for providing a shelf-stable snack product.

While simple geometric shapes (e.g., a spheres, ovoids, and crescents) may be produced using a simple extruder die outlet similar to that shown in FIG. 7, producing a suitable complexly shaped extruded piece requires further refinement of the extruder die outlet. As mentioned previously, a problematic aspect of direct expansion or puff extrusion devices involves the dimensional quality of the resulting direct expanded food products. The resulting individual pieces typically have a uniform, puffed shape with a cross-sectional shape generally corresponding to the outline of the extruder die outlet. While satisfactory for simple geometric shapes, the dimensional design details of more complex shapes tend to be obscured or eliminated. Thus, the present invention includes an improved extruder die outlet assembly for improving the dimensional design quality of complexly shaped puff extruded pieces.

Figure 8A:
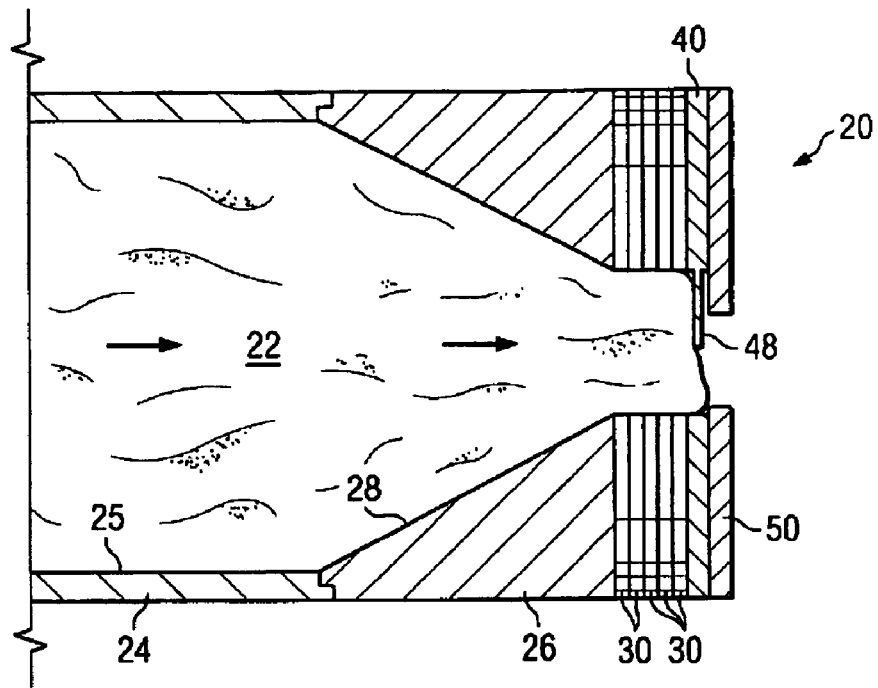
FIG. 8a is cross-sectional view of an embodiment of the extruder die assembly of the present invention.

Referring now to FIG. 8a, a cross-sectional view of an embodiment of the extruder die outlet assembly 20 of the present invention is shown. As shown in FIG. 8a, the improved extruder die outlet assembly 20 may include a transition insert section 26, a plurality of spacer insert elements 30, an imprinting insert element 40, and a forming insert element 50, all of which are coaxially aligned and interlocking.

The extruder die outlet assembly 20 of the present invention is designed for adaptation to a wide variety of commercial-grade extrusion devices common in the food industry. While the embodiment illustrated is shown as being generally cylindrical in shape, the exterior housing of the extruder die outlet assembly 20 may be of any shape necessary for adaptation to commercial-grade extrusion devices common in the food industry. The extruder die outlet assembly 20 is inserted into the appropriate compartment within an extrusion device (not shown) and connected to a coaxially aligned supply conduit 24 having a passageway 25 whereby an extrudate 22 (e.g., a paste or a cereal dough) is directed through the assembly 20. Upon exiting the improved extruder die outlet assembly 20, the extrudate 22 is thereupon directly expanded and cut into individual pieces in the conventional manner.

The transition insert section 26 attaches to the supply conduit 24 and directs the flow of extrudate 22 through passageway 28 to a passageway defined by apertures in each of the spacer insert elements 30. The cross sectional area of the passageway 28 defined through the transition insert section 26 may be reduced as necessary to smoothly transition the flow of extrudate 22 from the passageway 25 of supply conduit 24 to the passageway defined by apertures in each of the plurality of spacer insert elements 30. Of course, the transition insert section 26 may be dispensed with entirely if the supply conduit 24 may be attached directly to the plurality of spacer insert elements 30.

Figure 9:
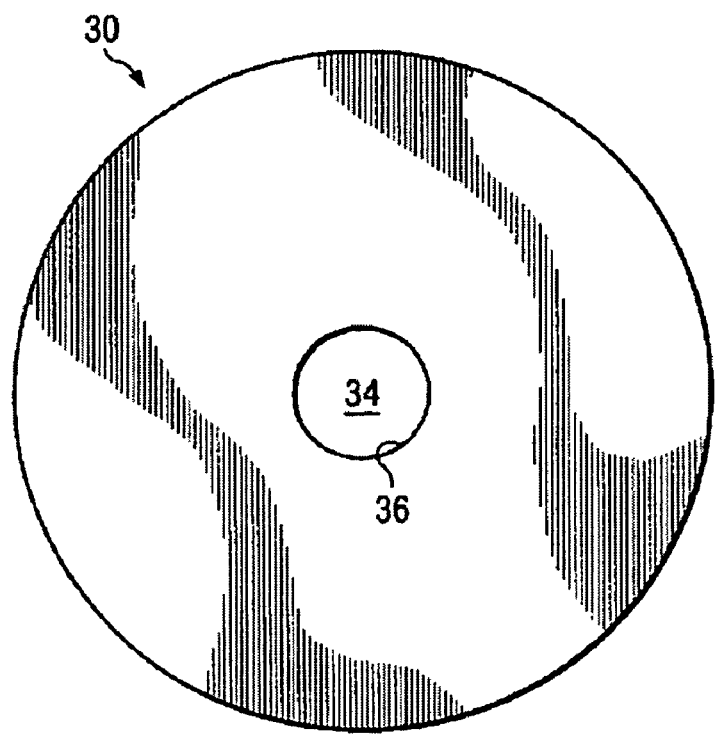
FIG. 9 is an exit face view of a spacer insert element used in an embodiment of the extruder die assembly of the present invention.

FIG. 9 illustrates the exit face 32 of spacer insert element 30. Each of the plurality of spacer insert elements 30 includes a matching aperture 34 defined therethrough having a circumference 36, such that when coaxially aligned, the plurality of spacer insert elements 30 define a passageway through which the extrudate 22 may flow.

Figure 10:
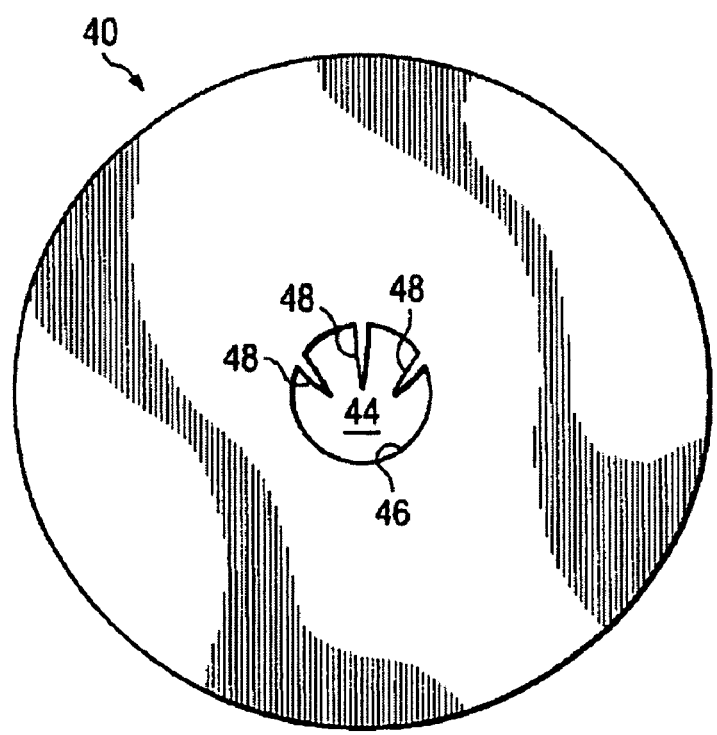
FIG. 10 is an exit face view of the imprinting insert element used in an embodiment of the extruder die assembly of the present invention.

Referring now to FIG. 10, an embodiment of the exit face 42 of the imprinting insert element 40 is illustrated. The imprinting insert element 40 includes an aperture 44 defined therethrough having a circumference 40 which generally corresponds to the circumference 36 of the aperture 34 defined in the spacer insert elements 30, with the exception that the aperture 44 of imprinting insert element 40 includes one or more prongs 48 projecting into the aperture 44.

Figure 11:
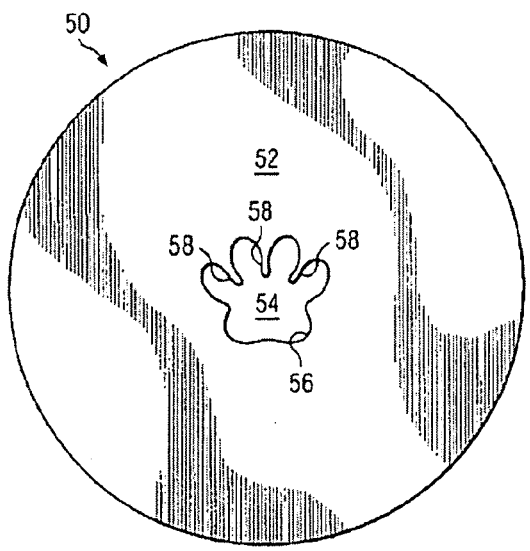
FIG. 11 is an exit face view of the forming insert element used in an embodiment of the extruder die assembly of the present invention.

FIG. 11 shows an embodiment of a forming insert element 50 used in the present invention. The forming insert element 50 includes an aperture 54 defined therethough having a complexly shaped circumference 56. The complex shape of circumference 56 is defined by one or more projections 58 which extend into the center of aperture 54.

Figure 8B:
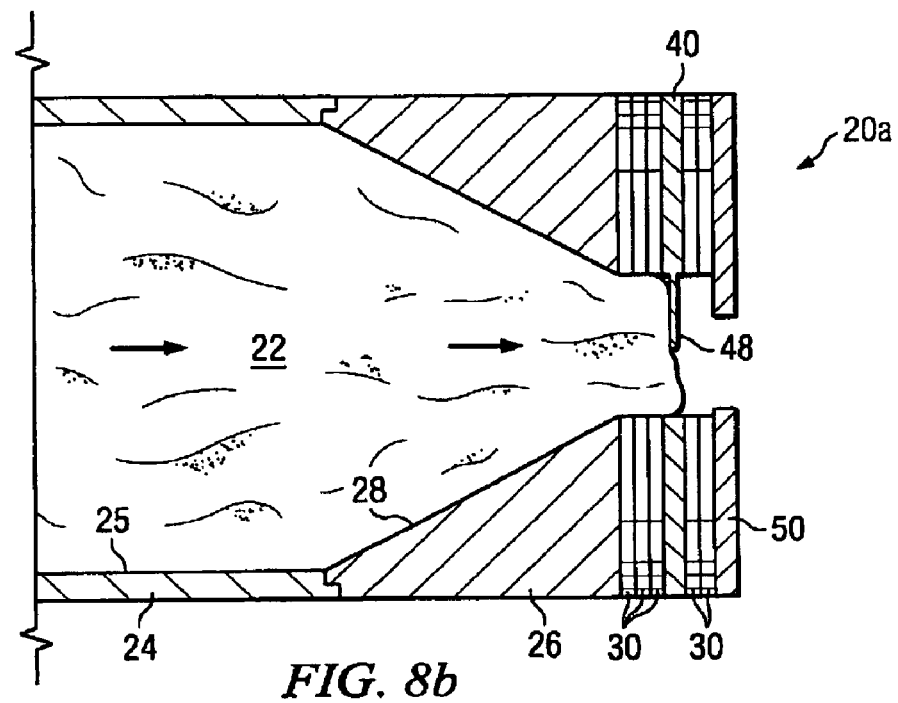
FIG. 8b is cross-sectional view of an alternate arrangement of an embodiment of the extruder die assembly of the present invention.
Figure 13:
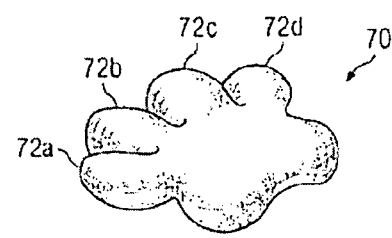
FIG. 13 depicts the resulting direct expanded food piece formed by utilizing an embodiment of the extruder die assembly of the present invention.
Figure 12:
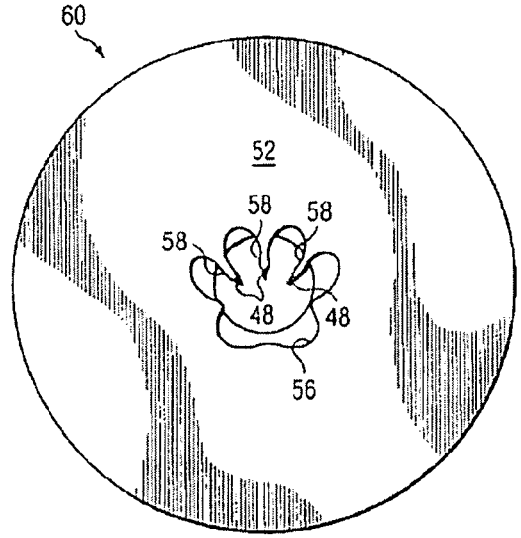
FIG. 12 is an exit face view of an embodiment of the extruder die assembly of the present invention.

As shown in the exit face view 52 of an embodiment of the extruder die outlet assembly of the present invention illustrated in FIG. 12, when the improved extruder die outlet assembly 20 of the present invention illustrated in FIGS. 8a and 8b is properly assembled and configured, each of the projections 58 of the forming insert element 50 is aligned with a prong 48 of the imprinting insert element 40. The prongs 48 momentarily disrupt the axial flow of the extrudate 22 altering its velocity profile prior to its extrusion through the aperture 54 of the forming insert element 50. By disrupting the axial flow of the extrudate 22 in the vicinity of the projections 58 in the forming insert element 50 prior to its extrusion, the dimensional quality of the resulting direct expanded food piece is greatly improved. As shown in FIG. 13, the resulting food piece 70 exhibits an improved three-dimensional quality such that each of the appendages 72a-d is more clearly defined and distinguishable from one another.

The axial distance between the one or more projections 58 and its corresponding prongs 48 may be adjusted as necessary to optimize the dimensional qualities of the resulting food piece depending upon the particular flow characteristics (e.g., flow velocity, viscosity, and texture) of each extrudate 22. For example, as shown in FIG. 8a, in one configuration of an embodiment of the extruder die outlet assembly 20, the imprinting insert element 40 is positioned directly upstream of the forming insert element 50. Alternatively, as shown in FIG. 8b, in another configuration of the embodiment of the extruder die outlet assembly 20a, two spacer insert elements 30 are inserted between the imprinting insert element 40 and the forming insert element 50. The thickness of each individual imprinting insert element 30 may be varied to allow incremental change of the axial distance between the imprinting insert element 40 and the forming insert element 50. The axial distance between the imprinting insert element 40 and the forming insert element 50 varies from 5 mm-55 mm, but in a preferred embodiment is 10 mm.

Those skilled in the art will recognize that the extruder die outlet assembly 20 shown in FIG. 8a may also be incorporated into the extruder die assemblies shown in FIGS. 2a and 7 in a variety of configurations. For example, in one arrangement the converging nozzle section 400, 400A may be configured to incorporate a transition insert section 26 and its assorted insert elements either separately or as an integrated unit. While such a configured converging nozzle will produce a complexly shaped direct expanded food product having improved dimensional qualities, the design of a distinct colored and/or flavored pattern imparted into the extruded food mass will often be disturbed by the a prong 48 of the imprinting insert element 40. Thus, it is necessary to further refine the design of the converging nozzle so that a distinct colored and/or flavored pattern imparted into the extruded food mass is not disturbed by the mechanism which improves the dimensional quality of the resulting direct expanded food piece.

Figure 14A:
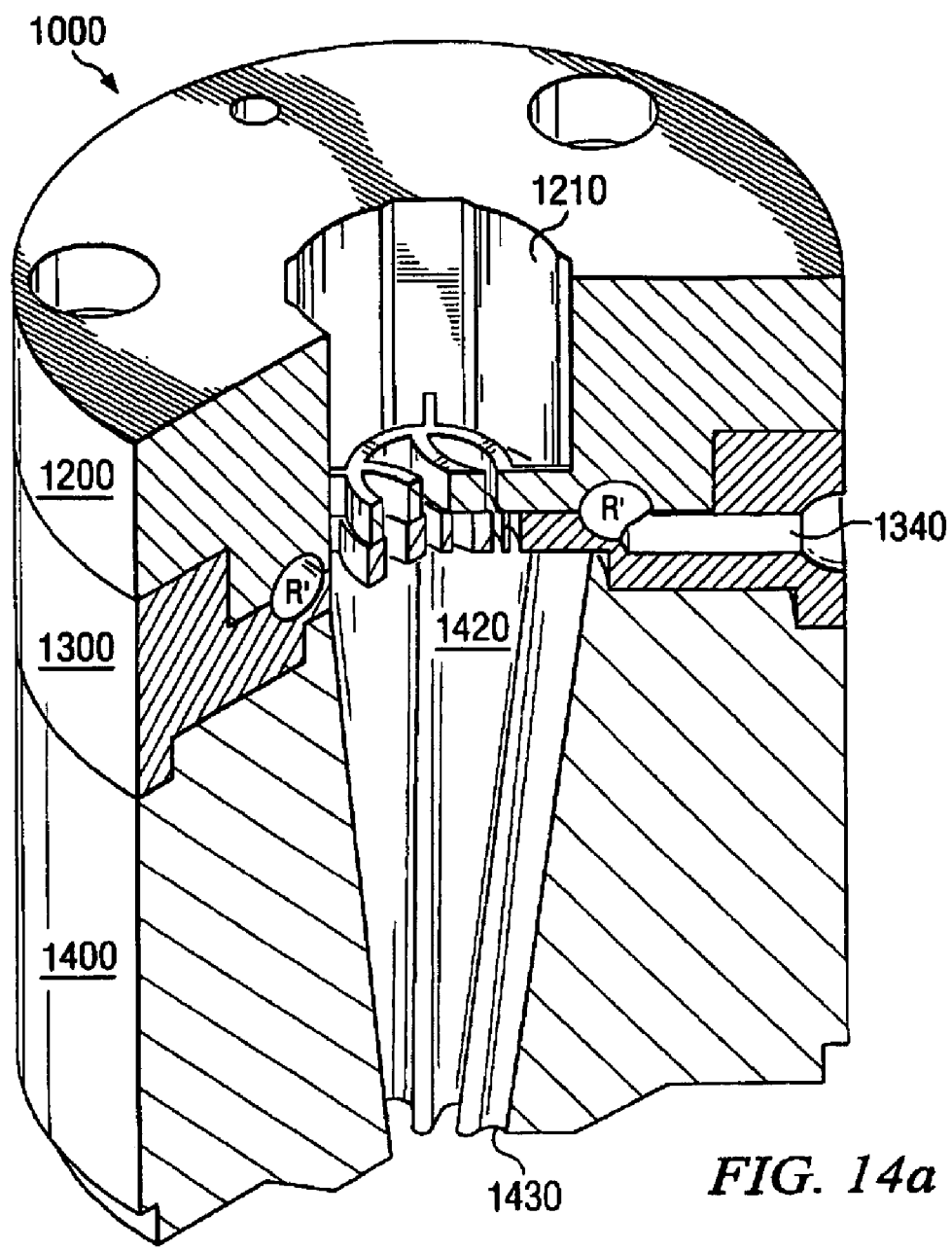
FIG. 14a is a cut-away perspective view of yet another alternate embodiment of the extruder die assembly of the present invention, which includes a converging nozzle section featuring a complexly shaped axial bore having axially aligned ridgelines.
Figure 14B:
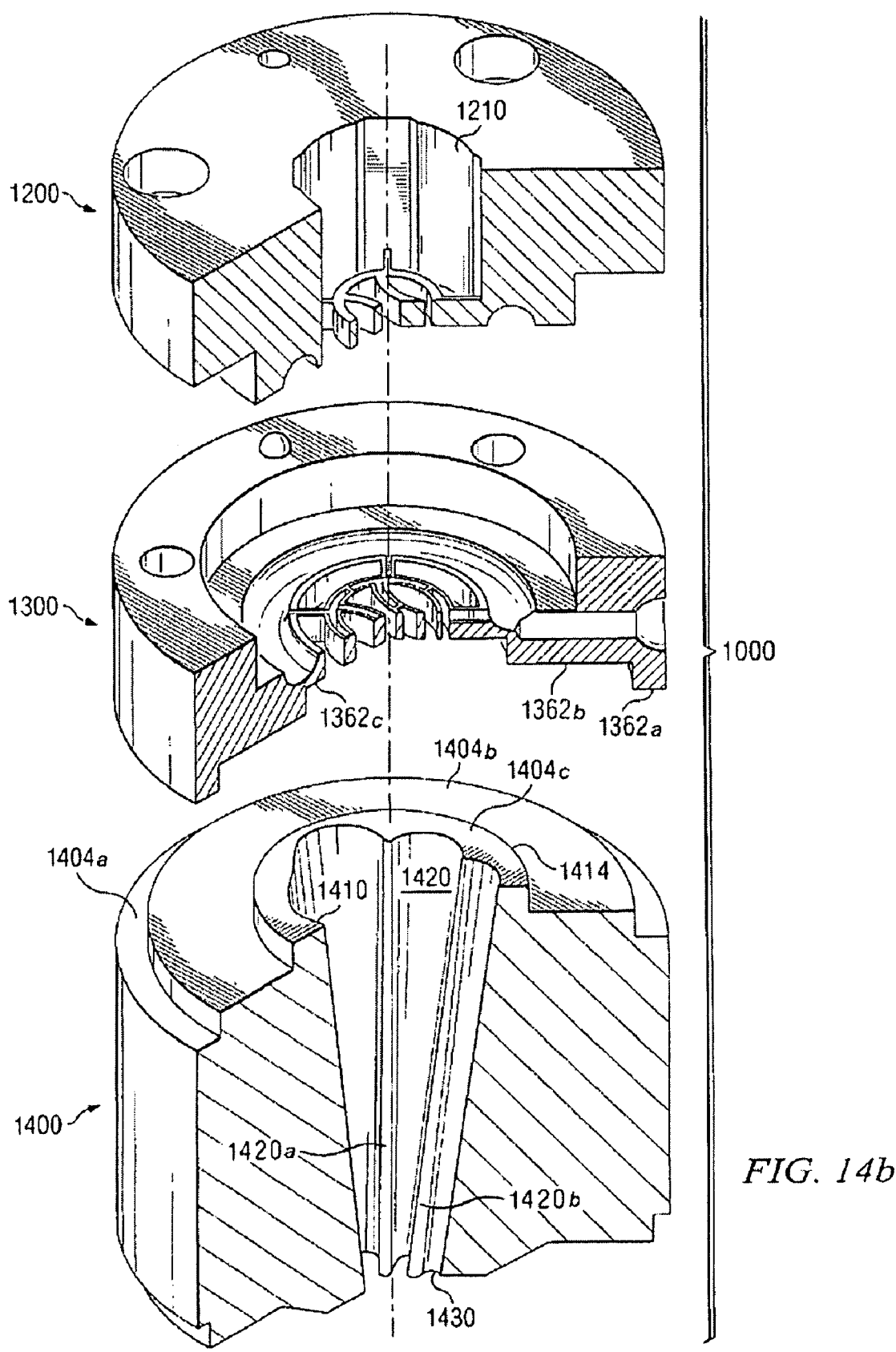

Referring now to FIGS. 14a and 14b, a preferred embodiment of the extruder die assembly of the present invention is shown. The extruder die assembly, generally indicated by reference character 1000 includes a forming section 1200, an injection section 1300, and a nozzle section 1400. As with the previous embodiments, the three sections comprising the die assembly 1000 are coaxially aligned and interlocking. Additionally, means for coupling the forming section 1200 to the injection section 1300 are also included. While the illustrated preferred embodiment is shown as being generally cylindrical in shape, the exterior housing of the die assembly 1000 may be of any shape necessary for adaptation to commercial-grade extrusion devices common in the food industry.

As with the previous embodiments, the preferred embodiment of the extruder die assembly 1000 is designed for adaptation to a wide variety of commercial-grade extrusion devices common in the food industry. The extruder die assembly 1000 is inserted into an appropriate compartment within an extrusion device (not shown) such that a first extrudate (e.g., a paste or a cereal dough) is directed down a coaxially aligned passageway 1210 within the forming section 1200 and combined with a fluid additive (e.g., a food coloring dye or a flowable colored and/or flavored food material) in the injection section 1300 via supply port 1340 and annular reservoir R', whereupon the resulting food mass is compressed through a complexly shaped converging nozzle bore 1420 in the nozzle section 1400 to produce a complexly shaped extruded food product containing a distinct colored and/or flavored pattern and having improved dimensional qualities.

Figure 15A:
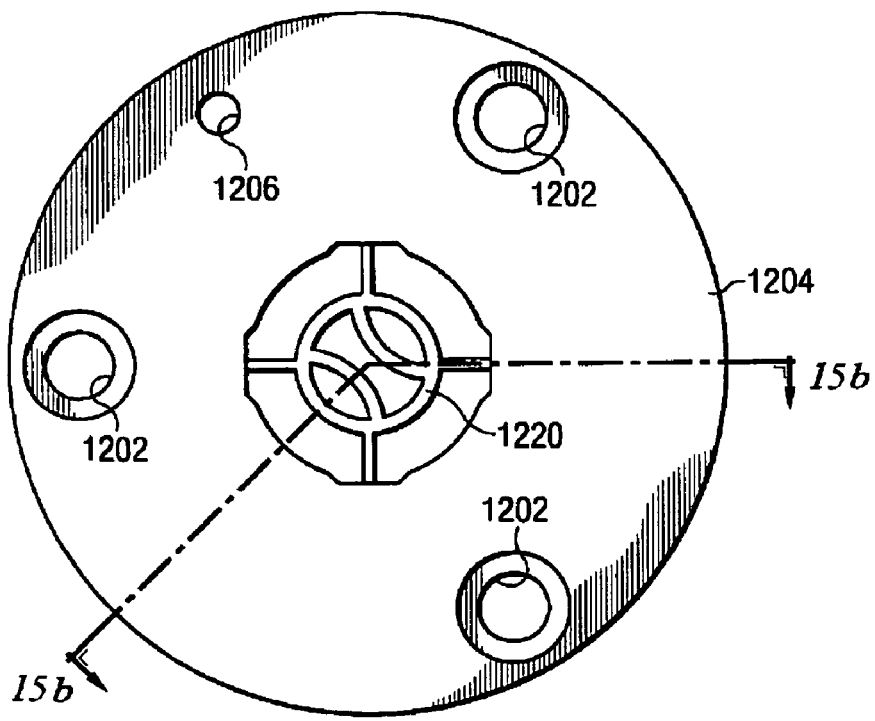
Figure 15B:
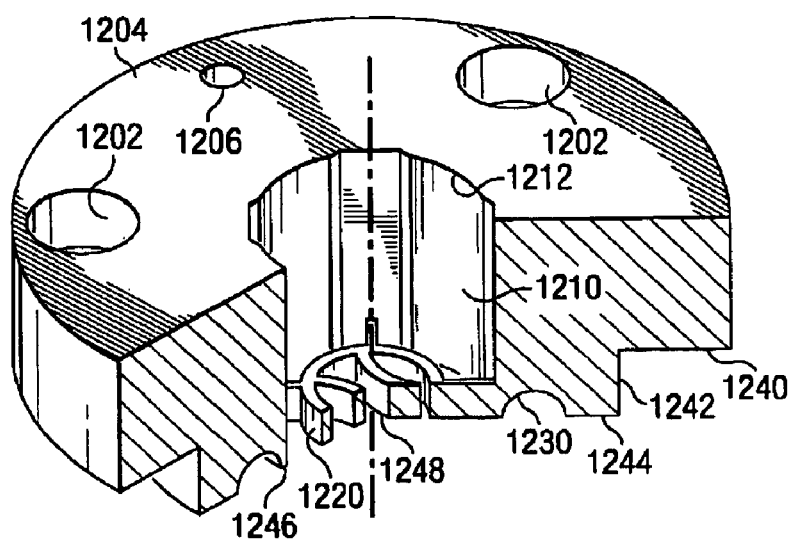

The forming section 1200 and injection section 1300 of the preferred embodiment 1000 are essentially identical in form and function as the previously described embodiments. Thus, as shown in FIGS. 15*a* and 15*b*, the forming section 1200 is a generally tubular flange element having a central bore defining a passageway 1210. The inlet 1212 of the passageway 1210 is adapted to receive a conduit (not shown) supplying a pressurized first extrudate from an extrusion device (not shown). A plurality of counter-sunk coupling holes 1202, equally spaced around the periphery of the entrance face 1204 of forming section 1200, are provided for receiving screws (not shown) for removably coupling the forming section 1200 to threaded holes 1302 in the injection section 1300. An alignment hole 1206 extends through the forming section 1200 in parallel alignment with the passageway 1210 to receive an alignment knob 1306 on the entrance face of the injection section 1300. When properly seated into the alignment hole 1206, the alignment knob 1306 ensures that the axial angular alignment of the injection section 1200 in relation to the forming section 1200 is correct.

The outlet portion of the passageway 1210 includes a forming die element 1220 which divides the flow of the first extrudate into at least two, and more preferably a plurality of adjacent flowing extrudate passageways.

As with the previously described embodiments, the forming section 1200 and injection section 1300 of the preferred embodiment of the extruder die assembly 1000 are fabricated as a matching set. In general, the outlet face of the forming section is designed to mate and seal with the inlet face of the injection section. In one embodiment, an inner peripheral rim formed in the outlet face of the forming section is specifically designed to slidably couple and align with a central bore in the inlet face of the injection section. The inner peripheral rim is defined by a peripheral notch formed in the outlet face of the forming section. The peripheral notch is characterized by a peripheral rim wall which is parallel with and generally equidistant from the outer periphery of the central passageway. The inner peripheral rim includes a peripheral groove with a semicircular cross-section. A matching peripheral groove with a semicircular cross-section is formed in the base of the central bore of the inlet portion of the injection section such that when the forming section and injection section are slidably coupled and aligned, an internal peripheral reservoir manifold R' is formed.

Thus, as shown in the figures, and in particular FIGS. 14*a*, 15*a*, and 15*b*, the inner peripheral rim formed in the outlet face of the forming section 1200 is an annular rim defined by an annular notch, characterized by the annular rim wall 1242 and the annular outer ring seal face 1240, around the outer periphery of the outlet face of the forming section 1200. The annular rim in the outlet face of the forming section 1200 slidably fits into a central bore in the inlet face of the injection section 1300 defined by the annular bore wall 1308 such that the forming section's annular outer ring seal face 1240 seats and seals with the injection section's annular outer seal face 1304, the forming section's intermediate annular seal face 1244 seats and seals with the injection section's annular intermediate ring seal face 1310, and the forming section's inner annular seal face 1246 and the exit face 1248 of the forming die element 1220 seat and seal with the entrance face 1322 of the injection section's co-injection die insert 1320. Moreover, the matching annular peripheral grooves 1230, 1330 form an annular internal peripheral reservoir manifold R' into which a fluid additive may be supplied. When properly aligned and coupled, the respective annular seals between the forming section 1200 and the matching injection section 1300 effectively seal and isolate the fluid additive supplied to the reservoir manifold R' from inadvertent leakage to the upstream side of the forming die element 1220 and the outer periphery of the extruder die assembly 1000.

As with the previously described embodiments, the injection section 1300 includes a co-injection die insert 1320 which has profile such that when properly aligned and coupled with the forming die element 1220, the seal between the exit face 1248 of the forming die element 1220 and the entrance face 1322 of the injection section's co-injection die insert 1320 ensures that the respective adjacently flowing extrudate passageways are unobstructed and contiguous and that the fluid additive contained in the reservoir manifold R' does not inadvertently leak to the upstream side of the forming die element 1220.

The co-injection die insert 1320 includes at least one and more preferably a plurality of capillary channels 1352 in the space between the plurality of passageways. The capillary channels 1352 are fluidly connected to the reservoir manifold R' via channel ports 1350. The reservoir manifold R' is fluidly connected to a pressurized source of fluid additive (not shown) via supply port 1340. Thus, as with the previously described embodiments, when properly aligned and coupled, the seal between the exit face 1248 of the forming die element 1220 and the entrance face of the injection section's co-injection die insert 1320 ensures that the pressurized fluid additive supplied to the annular internal peripheral reservoir manifold R' continually charges the capillary channels 1352 via channel ports whereupon each capillary channel 1352 emits at its downstream exit face a continuous discharge of fluid additive in the general cross-sectional shape of the capillary channel 1352 resulting in a continuous band of fluid additive being injected into the transient clefts formed in the first extrudate as it exits the adjacent flowing extrudate passageways. Upon exiting from the individual adjacent flowing extrudate passageways, the individual adjacently flowing columns of first extrudate coalesce to enclose the injected bands of fluid additive within a single flow mass thereby imparting a distinct colored and/or flavored pattern into the food mass.

As with the previously described embodiments, the injection section 1300 may include multiple supply ports 1340 fluidly connected to separate pressurized sources of fluid additive. In such an embodiment, the annular internal peripheral reservoir manifold R' may be divided into multiple segregated quadrants fluidly connecting individual pressurized sources of fluid additive to specific capillary channels 1352 allowing a distinct pattern of multiple colors and/or flavors to be imparted into the food mass.

Figure 16A:
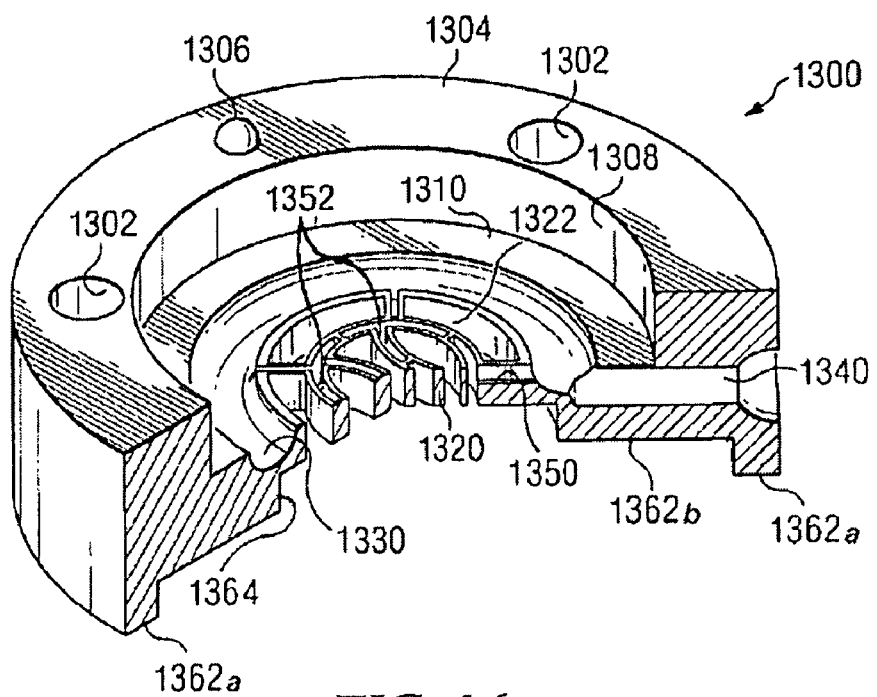
Figure 16B:
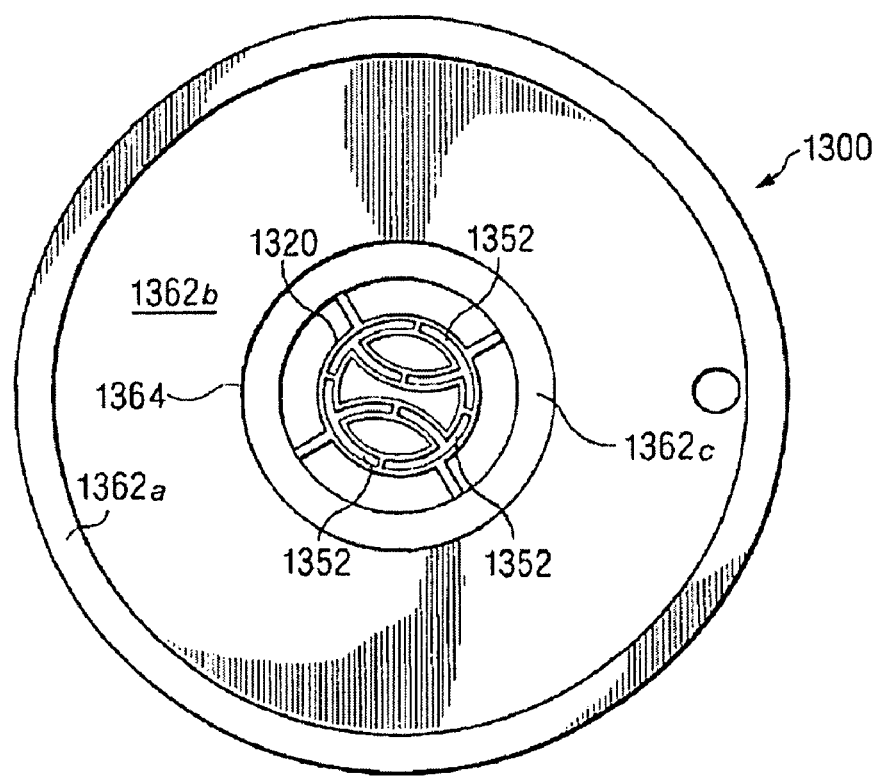
Figure 17A:
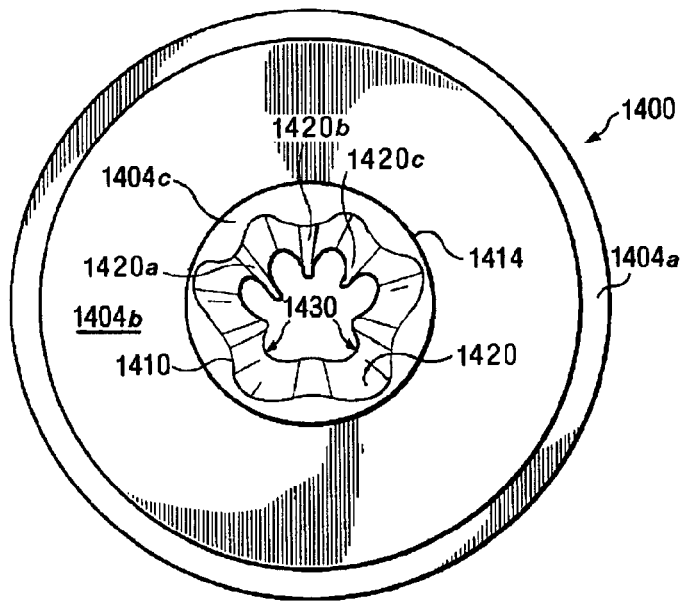

Referring to the figures, and in particular FIGS. 16*a*, 16*b* and 17*a*, the exit face of the injection section 1300 is generally designed to mate and seal with the inlet face of the nozzle section 1400. An inner annular rim 1414 projecting from the inlet face of the nozzle section 1400 slidably fits into a central bore formed in the outlet face of the injection section 1300 and defined by the annular bore wall 1364, such that the injection section's annular outer ring seal face 1362*a* seats and seals with the nozzle section's peripheral outer seal face 1404*a*, the injection section's intermediate annular seal face 1362*b* seats and seals with the nozzle section's intermediate annular ring seal face 1404*b*, and the injection section's inner annular seal face 1362*c* seats and seals with the nozzle section's inner annular ring seal face 1404*c*. Thus, with the exception of the co-injection die insert 1320 and the complexly-shaped inlet 1410, the exit face of the injection section 1300 is essentially a mirror image of the inlet face of the nozzle section 1400.

While the preferred embodiment's forming and injection sections are essentially identical in form and function as the previously disclosed embodiments, the nozzle section 1400 of the preferred embodiment 1000 differs in a number of aspects from the nozzle section 1400 shown in FIGS. 2a and 2b. Whereas the nozzle section 400 of previously disclosed embodiments included an inlet with a periphery matching the periphery of the forming section's passageway, the nozzle section 1400 of the preferred embodiment 1000 includes an inlet 1410 having a complexly shaped periphery which is larger than the periphery of the extrudate passageway extending through the forming section and injection sections. Thus, in operation, that portion of the extrudate flow into which a colored and/or flavored pattern has been imparted is positioned within the periphery of the inlet 1410.

Figure 18:
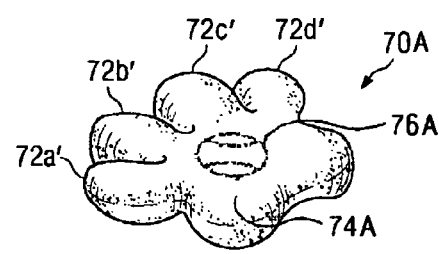
Figure 17B:
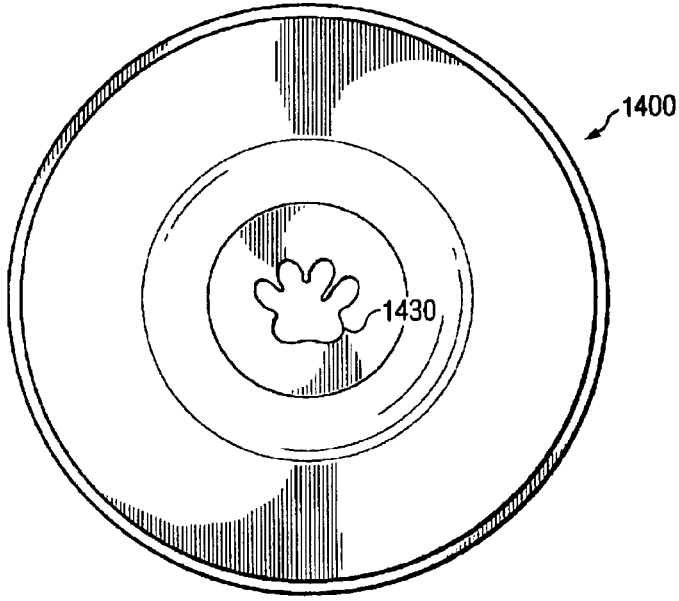

As with the previously described embodiments, the nozzle section 1400 further includes a passageway 1420 coaxially aligned with the forming section's passageway, which converges to an outlet 1430. However, whereas the previously disclosed embodiment of the nozzle section passageway 420 generally maintains its aspect ratio as its cross-sectional area is decreased, the nozzle section 1400 of the preferred embodiment 1000 shown in FIG. 14b includes a crucial modification. As shown most clearly in FIG. 17a, the periphery of inlet 1410 does not have the same geometric shape as the periphery of outlet 1430. Instead, for example, the complexly-shaped cross-sectional area that converses over its axial length from an inlet 1410 to an outlet 1430 resembles a baseball glove in one preferred embodiment. Indeed, while the outermost portions of the periphery of inlet 1410 generally maintain their aspect ratio to one another as the passageway 1420 converges to outlet 1430, those portions which essentially define the complex shape do not. Thus, as shown best shown in FIGS. 14b and 17a, the passageway 1420 includes axially aligned ridgelines (e.g., 1420a, 1420b, 1420c) positioned at specific peripheral points. The various peripheral points correlate to those geometric points that define the complex shape from a simple shape (e.g., a circle). As the passageway 1420 converges to outlet 1430, the axially aligned ridgelines (e.g., 1420a, 1420b, 1420c) gradually project into the bore of the nozzle passageway 1420. Thus, as the flowing extrudate passes through the nozzle section 1400, the axially aligned ridgelines (e.g., 1420a, 1420b, 1420c) gradually disrupt the axial flow of the extrudate at the specific peripheral points, thereby altering the extrudate's velocity profile. By gradually disrupting the axial flow of the extrudate in close proximity to the projecting ridgelines in the converging nozzle prior to its extrusion, the dimensional quality of the resulting direct expanded food piece is greatly improved. In addition, by carefully positioning the capillary channels 1352 of the injection section 1300 into that portion of the flowing extrudate not affected by the axially aligned ridgelines, a distinct colored and/or flavored pattern may be imparted into the extrudable food mass during the extrusion process. Moreover, the distinct pattern maintains its aspect ratio as it is compressed in the converging nozzle prior to its extrusion. Thus, as shown in FIG. 18, the resulting food piece 70A not only exhibits an improved three-dimensional quality such that each of the appendages 72a'-72d' is more clearly defined and distinguishable, but also includes a distinct colored and/or flavored pattern 76A, which resembles a baseball in one preferred embodiment, imparted in the center portion 74A of the resulting food piece 70A.

It will now be evident to those skilled in the art that there has been described herein an improved extruder die assembly and method for using the same to impart a distinct colored and/or flavored pattern into an extrudable food mass while improving the quality of dimensional design aspects of the resulting extruded, complexly shaped, direct expanded food products.

Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

The invention claimed is:

1. An extruder die assembly for improving the dimensional quality of a complexly shaped, direct expanded food product while imparting a distinct pattern therein, comprising:
 (a) a forming section comprising:
  (i) an entrance face having an inlet;
  (ii) a central passageway extending from the inlet to an outlet;
  (iii) a forming die element traversing the central passageway;
  (iv) an exit face having a first peripheral groove which circumscribes the outlet;
 (b) an injection section comprising:
  (i) an entrance face having a second peripheral groove circumscribing a co-injection die insert; said co-injection die insert having at least one capillary channel in fluid communication with the second peripheral groove, wherein said capillary channel includes an upstream discharge and a downstream discharge, said capillary channel imparting the distinct pattern;
  (ii) a supply port fluidly connecting the second peripheral groove to a fluid additive source;
 (c) means for coupling and sealing the exit face of the forming section to the entrance face of the injection section thereby positioning and aligning:
  (i) the first and second peripheral grooves so as to form and isolate a peripheral reservoir manifold therebetween;
  (ii) the forming die element and the co-injection die insert so as to seal the upstream discharge of the capillary channel;
 (d) a nozzle section comprising:
  (i) an entrance face having a complexly-shaped inlet, said inlet having a periphery which circumscribes said central passageway;
  (ii) a converging nozzle bore having at least one axially aligned ridgeline, wherein said ridgeline gradually projects into the nozzle bore as said nozzle bore converges; and
  (iii) an outlet having a complexly-shaped cross-sectional area.

2. The apparatus of claim 1, wherein the complexly-shaped cross-sectional area resembles a baseball glove.

3. The apparatus of claim 2, wherein the distinct pattern imparted resembles a baseball.

4. The apparatus of claim 1, wherein the cross-sectional area of the converging nozzle bore is reduced by a factor less than 20:1 between the inlet and the outlet of the nozzle section.

5. The apparatus of claim 1, wherein the cross-sectional area of the converging nozzle bore is reduced by a factor greater than 4:1 between the inlet and the outlet of the nozzle section.

* * * * *